US007006655B2

(12) United States Patent
Taniguchi et al.

(10) Patent No.: US 7,006,655 B2
(45) Date of Patent: Feb. 28, 2006

(54) METHODS, APPARATUS AND SYSTEMS FOR AN ELECTRONIC WATERMARK HAVING RESISTANCE TO SCALING

(75) Inventors: Masaaki Taniguchi, Yamato (JP); Shuhichi Shimizu, Yokohama (JP); Kohichi Kamijoh, Yokohama (JP); Ryoh Sugihara, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 716 days.

(21) Appl. No.: 09/952,589

(22) Filed: Sep. 11, 2001

(65) Prior Publication Data

US 2002/0114490 A1 Aug. 22, 2002

(30) Foreign Application Priority Data

Sep. 12, 2000 (JP) ............................. 2000-276129

(51) Int. Cl.
*H04K 1/00* (2006.01)
(52) U.S. Cl. ....................... 382/100; 348/461
(58) Field of Classification Search ................ 382/100, 382/232; 380/210, 252, 287, 54; 713/176; 348/461, 463, 467
See application file for complete search history.

(56) References Cited

U.S. PATENT DOCUMENTS

| 5,530,759 | A | 6/1996 | Braudaway et al. ........... 380/54 |
| 5,748,763 | A | 5/1998 | Rhoads ....................... 382/115 |
| 5,748,783 | A | 5/1998 | Rhoads ....................... 382/232 |
| 5,809,160 | A | 9/1998 | Powell et al. ............... 382/100 |
| 5,825,892 | A | 10/1998 | Braudaway et al. .......... 380/51 |
| 5,832,119 | A | 11/1998 | Rhoads ....................... 382/232 |
| 6,453,053 | B1 * | 9/2002 | Wakasu ....................... 382/100 |
| 6,665,418 | B1 * | 12/2003 | Honsinger ................... 382/100 |
| 6,678,390 | B1 * | 1/2004 | Honsinger ................... 382/100 |
| 2002/0094082 | A1 * | 7/2002 | Jones et al. .................. 380/219 |

FOREIGN PATENT DOCUMENTS

| EP | 0 851 679 A2 * | 7/1998 |
| JP | 11-341269 A | 12/1999 |
| JP | 2000-165805 A | 6/2000 |
| WO | WO 99/45705 A2 * | 9/1999 |
| WO | WO 99/45706 A2 * | 9/1999 |
| WO | WO 99/45707 A2 * | 9/1999 |
| WO | WO 01/24113 A1 * | 4/2001 |

OTHER PUBLICATIONS

Delannay et al., "Generalized 2-D Cyclic Patterns for Secret Watermark Generation," *Proc. 2000 Int. Conf. on Image Processing*, vol. II, Sep. 2000, pp. 77-79.*

(Continued)

*Primary Examiner*—Andrew W. Johns
(74) *Attorney, Agent, or Firm*—Scully, Scott, Murphy & Presser; Louis P. Herzberg

(57) ABSTRACT

The present invention provides methods, apparatus and systems for embedding and detecting an electronic watermark without requiring signals for geometric compensation. A particular embodiment uses a periodic pattern with repetition as an embedded pattern itself, which has information embedded as an electronic watermark, and observes the change of its period upon detection to calculate the scaling factor. When detecting the electronic watermark, the scaling factor of images is calculated from digital data that underwent the scaling processing, and then the processing to detect the electronic watermark is performed based on the obtained scaling factor.

26 Claims, 21 Drawing Sheets

OTHER PUBLICATIONS

Langelaar, "Chapter 3: Low Complexity Watermarks for MPEG Compressed Video," *Real-time Watermarking Techniques for Compressed Video Data*, Thesis presented at Technische Universiteit Delft, Feb. 2000, pp. 41-58.*

Kiya et al., "A Method of Inserting Binary Data into MPEG Video in the Compressed Domain," *IEICE Trans. Fundamentals*, vol. E82-A, No. 8, Aug. 1999, pp. 1485-1492.*

Maes et al., "Exploiting Shift Invariance to Obtain a High Payload in Digital Image Watermarking," *Proc. Int. Conf. on Multimedia Computing and Systems*, vol. 1, pp. 7-12, Jun. 1999.*

Kutter, "Watermarking resisting to translation, rotation, and scaling," *Proc. SPIE vol. 3528: Multimedia Systems and Applications*, Nov. 1998, pp. 423-431.*

* cited by examiner

Example of base block pattern (1)

$p_0$

| 1 | 1 | 1 | 1 | -1 | -1 | -1 | -1 |
|---|---|---|---|----|----|----|----|
| 1 | 1 | 1 | 1 | -1 | -1 | -1 | -1 |
| 1 | 1 | 1 | 1 | -1 | -1 | -1 | -1 |
| 1 | 1 | 1 | 1 | -1 | -1 | -1 | -1 |
| 1 | 1 | 1 | 1 | -1 | -1 | -1 | -1 |
| 1 | 1 | 1 | 1 | -1 | -1 | -1 | -1 |
| 1 | 1 | 1 | 1 | -1 | -1 | -1 | -1 |
| 1 | 1 | 1 | 1 | -1 | -1 | -1 | -1 |

$p_1$

| -1 | -1 | 1 | 1 | 1 | 1 | -1 | -1 |
|----|----|---|---|---|---|----|----|
| -1 | -1 | 1 | 1 | 1 | 1 | -1 | -1 |
| -1 | -1 | 1 | 1 | 1 | 1 | -1 | -1 |
| -1 | -1 | 1 | 1 | 1 | 1 | -1 | -1 |
| -1 | -1 | 1 | 1 | 1 | 1 | -1 | -1 |
| -1 | -1 | 1 | 1 | 1 | 1 | -1 | -1 |
| -1 | -1 | 1 | 1 | 1 | 1 | -1 | -1 |
| -1 | -1 | 1 | 1 | 1 | 1 | -1 | -1 |

Example of base block pattern (2)

$p_0$

| 1 | 1 | 1 | 0 | -1 | -1 | -1 | 0 |
|---|---|---|---|----|----|----|---|
| 1 | 1 | 1 | 0 | -1 | -1 | -1 | 0 |
| 1 | 1 | 1 | 0 | -1 | -1 | -1 | 0 |
| 1 | 1 | 1 | 0 | -1 | -1 | -1 | 0 |
| 1 | 1 | 1 | 0 | -1 | -1 | -1 | 0 |
| 1 | 1 | 1 | 0 | -1 | -1 | -1 | 0 |
| 1 | 1 | 1 | 0 | -1 | -1 | -1 | 0 |
| 1 | 1 | 1 | 0 | -1 | -1 | -1 | 0 |

$p_1$

| -1 | 0 | 1 | 1 | 1 | 0 | -1 | -1 |
|----|---|---|---|---|---|----|----|
| -1 | 0 | 1 | 1 | 1 | 0 | -1 | -1 |
| -1 | 0 | 1 | 1 | 1 | 0 | -1 | -1 |
| -1 | 0 | 1 | 1 | 1 | 0 | -1 | -1 |
| -1 | 0 | 1 | 1 | 1 | 0 | -1 | -1 |
| -1 | 0 | 1 | 1 | 1 | 0 | -1 | -1 |
| -1 | 0 | 1 | 1 | 1 | 0 | -1 | -1 |
| -1 | 0 | 1 | 1 | 1 | 0 | -1 | -1 |

Example of base block pattern (3)

$p_0$

| 1 | 1 | 0 | 0 | -1 | -1 | 0 | 0 |
|---|---|---|---|----|----|---|---|
| 1 | 1 | 0 | 0 | -1 | -1 | 0 | 0 |
| 1 | 1 | 0 | 0 | -1 | -1 | 0 | 0 |
| 1 | 1 | 0 | 0 | -1 | -1 | 0 | 0 |
| 1 | 1 | 0 | 0 | -1 | -1 | 0 | 0 |
| 1 | 1 | 0 | 0 | -1 | -1 | 0 | 0 |
| 1 | 1 | 0 | 0 | -1 | -1 | 0 | 0 |
| 1 | 1 | 0 | 0 | -1 | -1 | 0 | 0 |

$p_1$

| 0 | 0 | 1 | 1 | 0 | 0 | -1 | -1 |
|---|---|---|---|---|---|----|----|
| 0 | 0 | 1 | 1 | 0 | 0 | -1 | -1 |
| 0 | 0 | 1 | 1 | 0 | 0 | -1 | -1 |
| 0 | 0 | 1 | 1 | 0 | 0 | -1 | -1 |
| 0 | 0 | 1 | 1 | 0 | 0 | -1 | -1 |
| 0 | 0 | 1 | 1 | 0 | 0 | -1 | -1 |
| 0 | 0 | 1 | 1 | 0 | 0 | -1 | -1 |
| 0 | 0 | 1 | 1 | 0 | 0 | -1 | -1 |

Fig. 11

M"[shift_x][shift_y][0]

METHODS, APPARATUS AND SYSTEMS FOR AN ELECTRONIC WATERMARK HAVING RESISTANCE TO SCALING

FIELD OF THE INVENTION

The present invention relates to an electronic watermark in digital data, and more particularly to methods, apparatus and systems for an electronic watermark resistant to scaling operations.

BACKGROUND

In order to embed an electronic watermark for copyright management into digital data such as image contents, the embedded data should have resistance to various kinds of processing that the data experience after embedding. Above all, resistance to scaling processes, that is, enlargement and reduction operations, of images is important. Conventionally, in preparation for when the enlargement or reduction operation be performed to digital data with an electronic watermark embedded, one has coped with transformation operations of digital data by embedding calibration signals into digital data in addition to electronic watermark information in order to perform geometric compensation, and detecting the calibration signals. However, such a method requires embedding patterns for geometric compensation in addition to embedding information of the electronic watermark, thereby having possibilities to leading to deterioration in quality of original data or increase of detection time of embedded information.

Moreover, when patterns for geometric compensation are embedded in the frequency space, the inverse frequency conversion was required to detect them.

SUMMARY OF THE INVENTION

It is therefore an aspect of the present invention to provide a method and system for embedding and detecting an electronic watermark without requiring signals for geometric compensation.

It is another aspect of the invention to provide a method and system for embedding and detecting an electronic watermark that has reduced deterioration in quality of digital data.

It is a further aspect of the invention to provide a method and system for embedding and detecting an electronic watermark that reduces detection time of the electronic watermark.

It is a further aspect of the invention to provide a method and system for embedding and detecting an electronic watermark that can calculate the scaling factor without requiring the inverse frequency conversion.

It is a further aspect of the invention to provide a method and system for detecting an electronic watermark that detects the electronic water mark from the scaled digital data with higher precision.

It is a further aspect of the invention to provide a method and system for detecting an electronic watermark that detects the electronic watermark without requiring to return the scaled digital data to the original scale.

BRIEF DESCRIPTION OF THE DRAWINGS

These and other aspects, features, and advantages of the present invention will become apparent upon further consideration of the following detailed description of the invention when read in conjunction with the drawing figures, in which:

FIG. 11 depicts an example of periodic embedded patterns;

DESCRIPTION OF THE SYMBOLS

Figure 1:
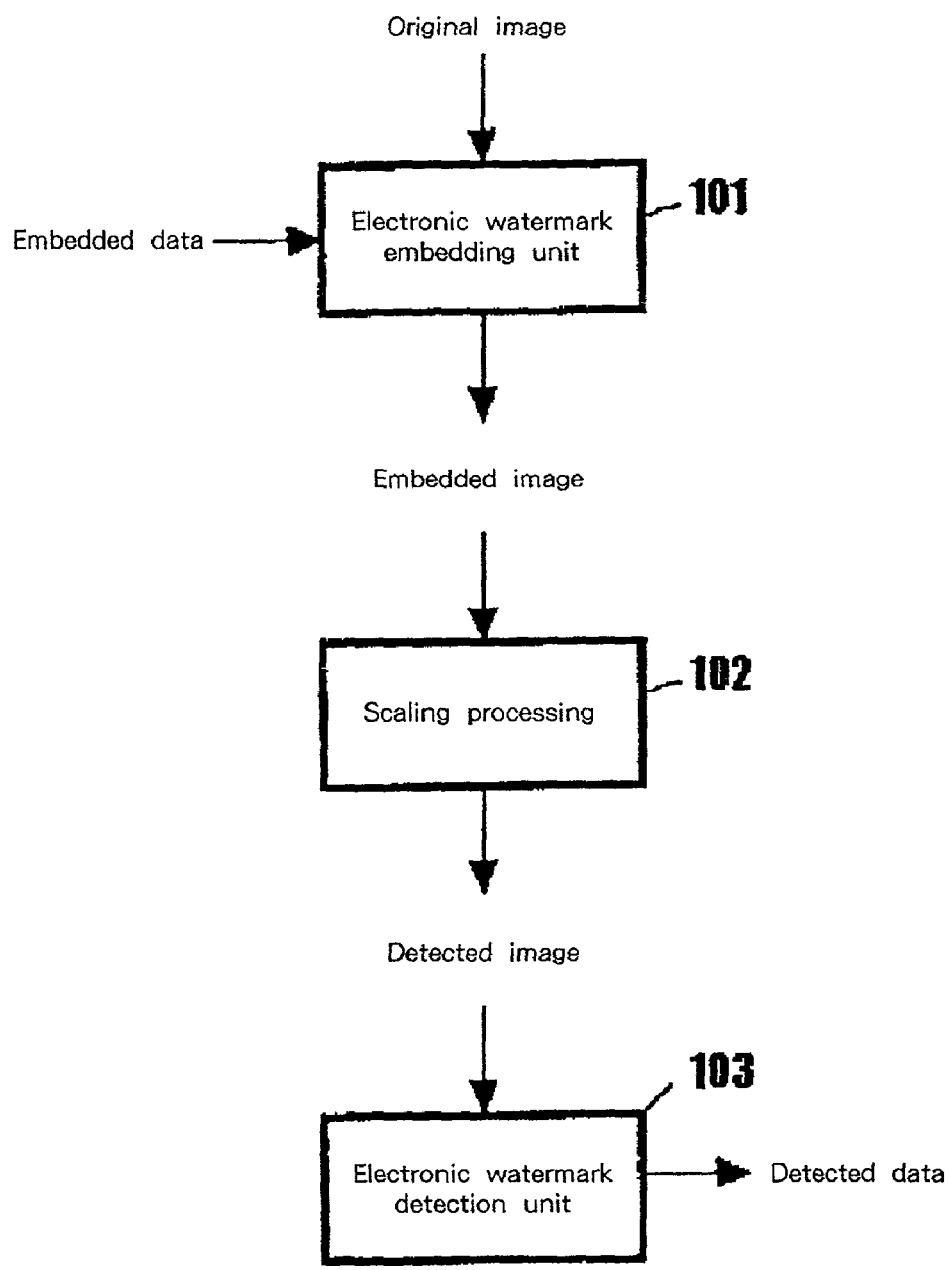
FIG. 1 depicts an example of a configuration of an entire system.

1: CPU
2: Bus

4: Memory
5: Keyboard mouse controller
6: Keyboard
7: Mouse
8: Display adaptor card
9: Video memory
10: DAC/LCDC
11: Display device
12: CRT display
13: Hard disk drive
14: ROM
15: Serial port
16: Parallel port
17: Timer
18: Communication adaptor
19: Floppy disk controller
20: Floppy disk drive
21: Audio controller
22: Amplifier
23: Speaker
24: Microphone
25: IDE controller
26: CD-ROM
27: SCSI controller
28: MO
29: CD-ROM
30: Hard disk drive
31: DVD
32: DVD
100: System

DESCRIPTION OF THE INVENTION

In order to solve the above problems in an example embodiment, the present invention uses a periodic pattern with repetition as an embedded pattern itself, which has information that is embedded as an electronic watermark, and observes the change of its period upon detection to calculate the scaling factor. When detecting the electronic watermark, the scaling factor of images is calculated from digital data that underwent the scaling processing, and then the processing to detect the electronic watermark is performed based on the obtained scaling factor. The feature of the present invention is that it does not need the specific second embedded pattern for geometric compensation to detect the scaling factor, and that it can detect the scaling factor and the electronic watermarks without performing the inverse discrete cosine transform on the MPEG encoded data.

Now, the technique for finding the scaling factor operating upon digital data will be described for the purpose of providing the resistance to scaling for the electronic watermark (hereinafter, examples of digital data are also simply referred to as data or image). First, as a typical case, a detection technique will be described when data is not encoded to MPEG format. Particular embodiments of the present invention use a periodic pattern with repetition as a pattern that is to be added to an image upon embedding and observes the change of its period upon detection to calculate the scaling factor. Assuming the scaling factor is s, a pixel data i(x,y) in one frame of an image changes as follows.

$$i'(sx, sy) = i(x, y) \quad (1)$$

where x and y represent the coordinates of pixels. When an image undergoes the scaling processing, the horizontal or vertical scaling factor should be found. Accordingly, finding the horizontal scaling factor will be described. Generally, embedding an electronic watermark is regarded as an operation of adding patterns (i.e., digital patterns having information to be embedded) to image data. Therefore, the following equation is established.

$$i(x,y) = i_s(x,y) + p(x,y)$$

where $i_s(x,y)$ is an original image, and $p(x,y)$ is a pattern added to the original image to embed information. The present invention detects the scaling factor by means of periodic change of $p(x,y)$. Hence, $p(x,y)$ should have the following natures.

$$p(x+h, y) = p(x, y)$$

where h is a repetition period. Upon detection, autocorrelation is given by the following equation. Note that the autocorrelation is a method for calculating an optimal period by comparing patterns that themselves have been embedded repetitively.

$$C_o = \frac{\sum_x \sum_y p'(x, y) p'(x+o, y)}{\sqrt{\sum_x \sum_y (p'(x, y))^2} \sqrt{\sum_x \sum_y (p'(x+o, y))^2}} \quad \text{[Equation 1]}$$

Assuming the scaling factor operated is $\rho$, $C_o$ has a peak under the condition where o meets the following equation.

$$\rho \approx o/h$$

where $p'(x,y)$ is the embedded pattern component that is extracted from a detected image $i'(x,y)$. Then, o is changed within the range of scaling factor that is desired to be found. The scaling factor would be found with precision of 1/h by finding o that maximizes $C_o$.

Repetitive patterns that are actually embedded need not be completely the same and may change within the range where the peak of autocorrelation appears. Generally, in the electronic watermark, partial patterns are used or the strength of patterns is changed for each pixel (in order that the embedded patterns may be difficult to be perceived), however, it is possible to detect the scaling factor even in such a case. For moving images comprised of plural frames such as MPEG data, a peak of more strong autocorrelation can be obtained by adding the detected value from each frame. In this case, as detection from each frame is performed independently, there is no need to use the same embedded pattern between added frames.

Next, a technique for detecting the scaling factor from MPEG data will be described. Using MPEG data as a divided into intra blocks of 8×8 pixels in size and is DCT-operated. When calculating autocorrelation without performing inverse DCT, the scaling factor can be found only with precision of 8/h in the processing performed in units of intra blocks. Accordingly, in addition to the condition of p(x+h,y)=p(x,y), an embedded pattern is to be composed of a tuple of two orthogonal base block patterns of 8×4 pixels in size (i.e., their inner product is zero).

Now, a tuple of base block patterns has the following nature (other base block patterns may exist).

$$\vec{p_o} \cdot \vec{p_{os}} = k\cos\left(\frac{2s\pi}{8}\right)$$ [Equation 2]

$$\vec{p_1} \cdot \vec{p_{os}} = k\sin\left(\frac{2s\pi}{8}\right)$$

Note that $p_0$ and $p_1$ are base block pattern vectors, $p_{os}$ is a block pattern of $p_o$ being cyclically shifted in the horizontal direction, k is a constant, and · represents an inner product operation. The inner product operation means adding the products of the same components of vectors. Several examples of the above-mentioned base block patterns are shown in FIG. 11.

Calculation of autocorrelation is performed for each block in order to detect the scaling factor. The following equation is substituted for the above equation 1 to calculate autocorrelation for each block.

$$C_o = \frac{\sum_X \sum_Y I(X,Y)I^*(X+O,Y)}{\sqrt{\sum_X \sum_Y |I^*(X,Y)|^2} \sqrt{\sum_X \sum_Y |I^*(X+O,Y)|^2}}$$ [Equation 3]

where $I(X,Y)=D(X,Y)\cdot P_0+jD(X,Y)\cdot P_1$ $I^*(X,Y)=D(X,Y)\cdot P_0-jD(X,Y)\cdot P_1$ and $D(X,Y)$ is a vector of 64 DCT coefficients of $(X,Y)$th intra block of a detected image, $P_0$ and $P_1$ are DCT vectors of $p_0$ and $p_1$, respectively, · is inner product operation, and j is an imaginary unit. The scaling factor is given by the following equation based on O that maximizes $|C_o|$, in equation 3.

$$\rho \cong \frac{8\left(O - \frac{\theta}{2\pi}\right)}{h}$$ [Equation 4]

where θ represents the phase when representing equation 3 by polar coordinates, that is, $$C_o = |C_o|e^{j\theta}$$ Equation 5

According to this, the scaling factor can be given with precision of 1/h even in case of MPEG data.

In order to finally detect an electronic watermark data from detected data that was enlarged or reduced, it is necessary to match the detected data and detected patterns depending on the found enlargement or reduction scaling factor. However, when the enlargement or reduction scaling factor is small, the detection becomes approximately possible by shifting the detected pattern little by little to apply to the detected block. According to this, the processing needed for enlargement or reduction can be replaced with the shift processing, and further the shift patterns that have been prepared in advance can be used if the shift is limited, thereby making the processing much faster.

That is, when the enlargement or reduction scaling factor is not large, the electronic watermark can be detected directly from the enlarged or reduced detected data itself, by combining the prepared detected pattern that was shifted in advance to apply to the detected block, without enlarging or reducing the detected pattern.

Using the aforementioned method in the horizontal and vertical directions respectively in the independent manner, there are provided a method and system for electronic watermark that are resistant to enlargement and reduction being not equate (i.e., the aspect ratio changes). Note that the aforementioned embodiment took MPEG data as an example, one sheet of compressed image data (e.g., JPEG data) is also implemented in completely the same manner.

A Configuration of an entire system is now described for an advantageous embodiment.

FIG. 1 depicts the configuration of the entire system. The electronic watermark embedding unit 101 generates an embedded image from an original image for input data and embedded data. The embedded image is converted to compressed data such as digital signals, analog signals, MPEG, JPEG, etc., and is stored or delivered depending on the purposes. The embedded image may undergo scaling processing 102 in the course of storage or delivery, for the purpose of invalidating the processing performed after embedding or the electronic watermark. The electronic watermark detection unit 103 inputs the detected image (i.e., the embedded image that has been stored or delivered and the unembedded image) and detects and outputs the electronic watermark as detected data.

Figure 2:
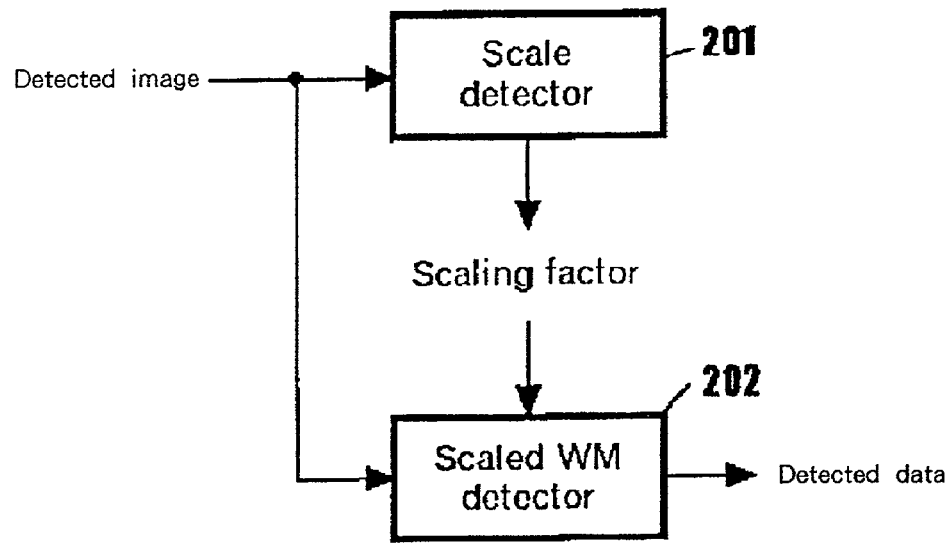
FIG. 2 depicts an overview of an example of a electronic watermark detection unit.

An overview of the electronic watermark detection unit 103 is shown in FIG. 2. The scale detector 201 detects, from the detected image for input data, the scaling processing performed on it and outputs the scaling factor. Detection of scaling factors subject to the present invention includes the following.

H-Scaling Only

This indicates the detected image that has undergone the scaling processing only in the horizontal direction. Assuming that the embedded image is $I(x,y)$, the detected image is $I'(x,y)$, and the scaling factor is s, the following relation is established.

$$I'(sx,y) \approx I(x,y)$$

Note that when sx does not placed on the grid, an appropriate interpolation processing should be performed.

V-Scaling Only

This indicates the detected image that has undergone the scaling processing only in the vertical direction. Assuming that the embedded image is $I(x,y)$, the detected image is $I'(x,y)$, and the scaling factor is s, the following relation is established.

$$I'(sx,y) \approx I(x,y)$$

Note that when sy does not placed on the grid, an appropriate interpolation processing should be performed.

H=V-Scaling

This indicates the detected image that has undergone the scaling processing both in the horizontal and vertical directions with the same scaling factor. Assuming that the embedded image is $I(x,y)$, the detected image is $I'(x,y)$, and the scaling factor is s, the following relation is established.

a:

$$I'(sx,y) \approx I(x,y)$$

Note that when sx or sy does not placed on the grid, an appropriate interpolation processing should be performed.

H≠V-Scaling

This indicates the detected image that has undergone the scaling processing both in the horizontal and vertical directions with the differing scaling factor. Assuming that the embedded image is I(x,y), the detected image is I'(x,y), and the scaling factors are s1 and s2, the following relation is established.

$$I'(s1x, s2y) \approx I(x,y)$$

Note that when s1x or s2y does not placed on the grid, an appropriate interpolation processing should be performed.

Detection of scaling factors in other directions is also possible by changing the direction of repetition of the embedded pattern. (Refer to the WM format for detection of scaling factors described below in relation to FIG. 9.) Furthermore, the detected results obtained like this can be substituted for H-scaling or V-scaling. Scaled WM detector 202 receives detected images and scaling factors as input data and detects the electronic watermark by a technique such as scaling the detected image depending on the input scaling factor, or scaling the detected pattern, and outputs the electric watermark as detected data.

Figure 3:
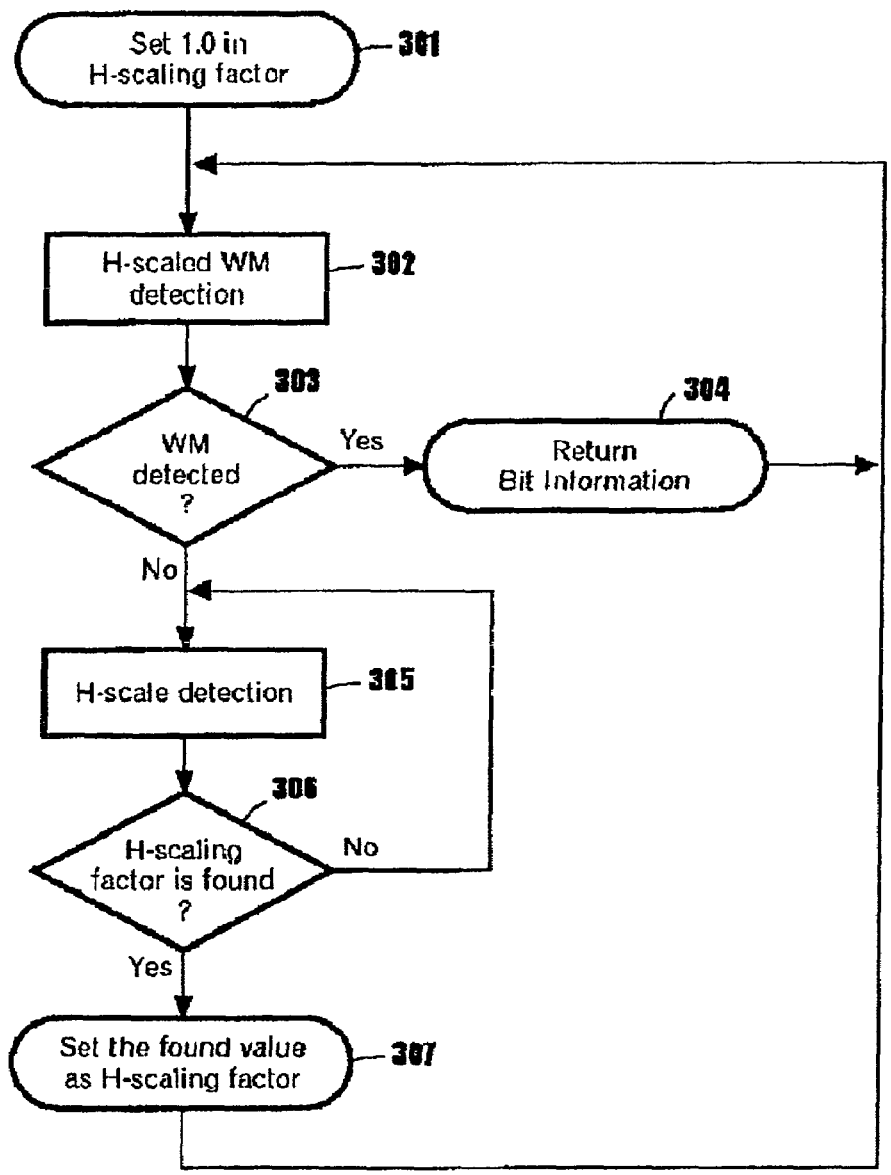
FIG. 3 depicts an example of a flowchart when detecting electronic watermarks from detected images having scaled only in the horizontal direction.

A flowchart of electronic watermark detection unit that deals with horizontal scaling only is now described. FIG. 3 depicts the flowchart when detecting electronic watermarks from detected images with H-scaling only (i.e., scaled only in the horizontal direction).

In step 301, the scaling factor in the horizontal direction (H-scaling factor) is set to 1.0, since the detection of electronic watermarks is performed assuming the scaling processing has not been performed.

In step 302, assuming the detected images have been scaled at the given H-scaling factor, the electronic watermarks are detected from the detected images. This step is performed by the scaled WM detector 202 shown in FIG. 2. Step 303 is a conditional branch. If the set H-scaling factor is correct, the detection of electronic watermarks in step 303 results in successful. In this case, the process goes to step 304 and outputs the detected data as bit information. Thereafter, the process goes back to step 302 and continues to detect electronic watermarks using the same H-scaling factor. If the detection of electronic watermarks fails in step 303, the set H-scaling factor is regarded as incorrect and then the process goes to step 305 to detect a correct H-scaling factor (i.e., H-scale detection). That is, step 305 is a step to detect H-scaling factor from the detected image, which is performed by the scale detector 201 shown in FIG. 2. Step 306 is a conditional branch. If the H-scaling factor has been detected in step 305, the detected H-scaling factor is set to be a new H-scaling factor in step 307, then the process goes back to step 302 and performs the detection of electronic watermarks based on this scaling factor. If the H-scaling factor has not been detected in step 306, the process goes back to step 305 and continues H-scale detection. Regarding the flowchart when detecting electronic watermarks from detected images with V-scaling only (i.e., scaled only in the vertical direction), one can consider similarly by replacing H with V in FIG. 3.

Figure 4:
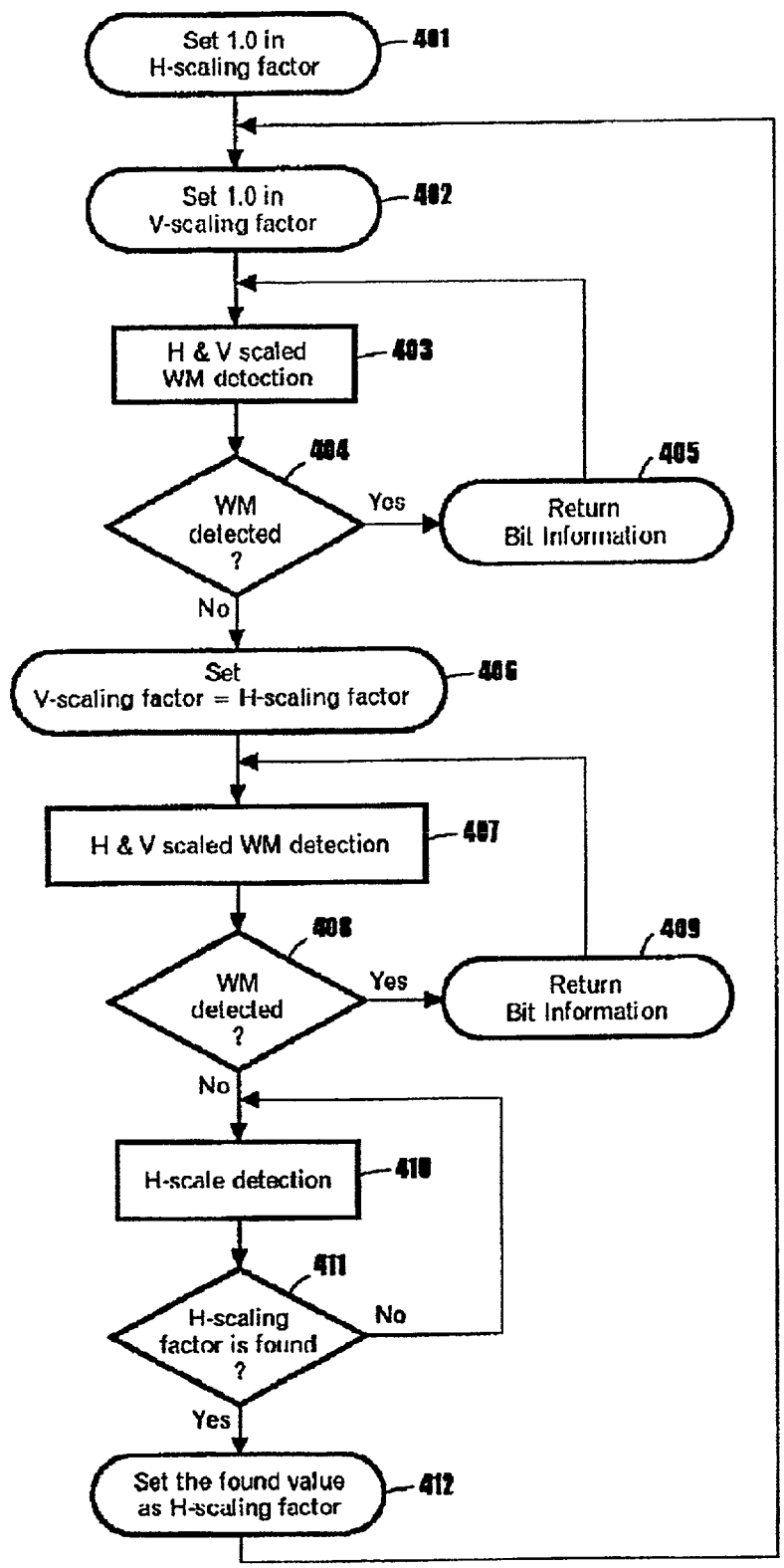
FIG. 4 depicts an example of a flowchart when detecting electronic watermarks from detected images having scaled only in the horizontal direction or having the same scaling factor in the horizontal and vertical directions.

An example flowchart of electronic watermark detection unit that deals with only horizontal scaling and both horizontal and vertical scaling having the same scaling factor is now described. FIG. 4 depicts a flowchart when detecting electronic watermarks from detected images with H-scaling only (i.e., scaled only in the horizontal direction) or with H=V-scaling (i.e., having the same scaling factor in the horizontal and vertical directions).

In step 401, the scaling factor in the horizontal direction (H-scaling factor) is set to 1.0, since the detection of electronic watermarks is performed assuming the scaling processing in the horizontal direction has not been performed.

In step 402, the scaling factor in the vertical direction (V-scaling factor) is set to 1.0, since the detection of electronic watermarks is performed assuming the scaling processing in the vertical direction has not been performed.

In step 403, assuming the detected images have been scaled at the given H-scaling factor and V-scaling factor, the electronic watermarks are detected from the detected images. This step is performed by the scaled WM detector 202 shown in FIG. 2. Step 404 is a conditional branch. If the set H-scaling factor and V-scaling factor are correct, the detection of electronic watermarks in step 403 results in successful. In this case, the process goes to step 405 and outputs the detected data as bit information. Thereafter, the process goes back to step 403 and continues to detect electronic watermarks using the same H-scaling factor and V-scaling factor. If the detection of electronic watermarks fails in step 404, it is regarded that the scaling processing is performed in the vertical direction as well, and then in step 406, V-scaling factor is set equal to H-scaling factor and the process goes to step 407 where the detection of electronic watermarks is performed using this scaling factor. That is, step 407 is a step to detect electronic watermarks from the detected images assuming the detected images have been scaled at the given H-scaling factor and V-scaling factor. This step is performed by the scaled WM detector 202 shown in FIG. 2. Step 408 is a conditional branch. If the set H-scaling factor and V-scaling factor are correct, the detection of electronic watermarks in step 407 results in successful. In this case, the process goes to step 409 and outputs the detected data as bit information. Thereafter, the process goes back to step 407 and continues to detect electronic watermarks using the same H-scaling factor and V-scaling factor. If the detection of electronic watermarks fails in step 408, the set H-scaling factor is regarded as incorrect and then the process goes to step 410 to perform H-scale detection. That is, step 410 is a step to detect H-scaling factor from the detected image, which is performed by the scale detector 201 shown in FIG. 2. Step 411 is a conditional branch. If the H-scaling factor has been detected in step 410, the detected H-scaling factor is set to be a new H-scaling factor in step 412, then the process goes back to step 402 and performs the detection of electronic watermarks assuming that the scaling is performed only in the horizontal direction with this scaling factor. If the H-scaling factor has not been detected in step 411, the process goes back to step 410 and continues H-scale detection. Regarding the scaling factors used in H=V-scaling, it is possible to use detected results of scaling factors in other directions such as that of V-scaling factor, except for the aforementioned method using the detected result of H-scaling factor.

Figure 5:
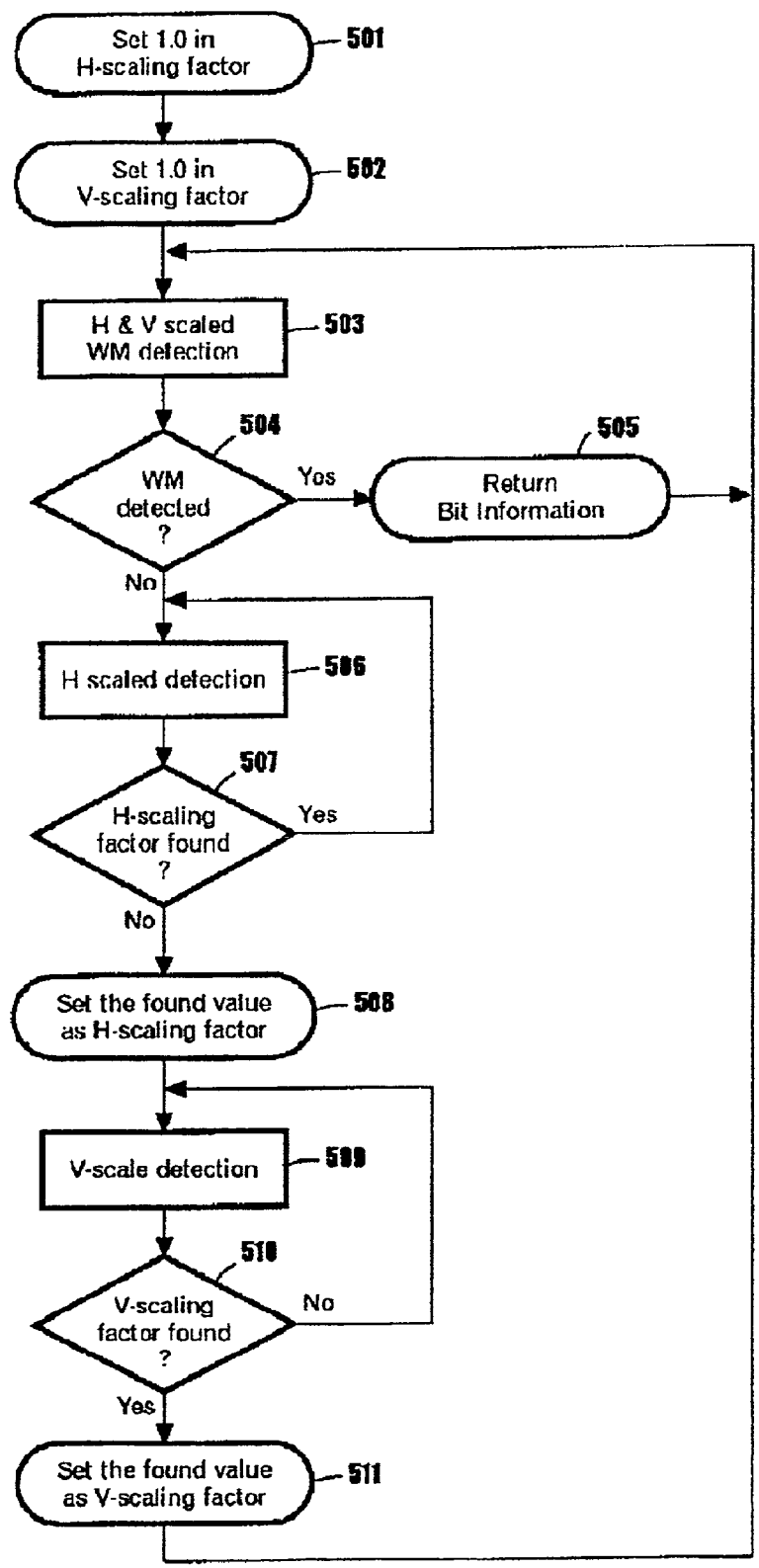
FIG. 5 depicts an example of a flowchart when detecting electronic watermarks from detected images having the differing scaling factors in the horizontal and vertical directions.

An example flowchart of electronic watermark detection unit that deals with horizontal and vertical scaling having the differing scaling factors is now described. FIG. 5 depicts the flowchart when detecting electronic watermarks from detected images with H≠V-scaling (i.e., having the differing scaling factors in the horizontal and vertical directions).

In step 501, the scaling factor in the horizontal direction (H-scaling factor) is set to 1.0, since the detection of electronic watermarks is performed assuming the scaling processing in the horizontal direction has not been performed.

In step 502, the scaling factor in the vertical direction (V-scaling factor) is set to 1.0, since the detection of electronic watermarks is performed assuming the scaling processing in the vertical direction has not been performed.

In step 503, assuming the detected images have been scaled with the given H-scaling factor and V-scaling factor, the electronic watermarks are detected from the detected images. This step is performed by the scaled WM detector 202 shown in FIG. 2. Step 504 is a conditional branch. If the set H-scaling factor and V-scaling factor are correct, the detection of electronic watermarks in step 503 results in successful. In this case, the process goes to step 505 and outputs the detected data as bit information. Thereafter, the process goes back to step 503 and continues to detect electronic watermarks using the same H-scaling factor and V-scaling factor. If the detection of electronic watermarks fails in step 504, the set H-scaling factor and V-scaling factor are regarded as incorrect and then the process goes to step 506 to detect a correct H-scaling factor (i.e., H-scale detection). That is, step 506 is a step to detect H-scaling factor from the detected image, which is performed by the scale detector 201 shown in FIG. 2. Step 507 is a conditional branch. If the H-scaling factor has been detected in step 506, the detected H-scaling factor is set to be a new H-scaling factor in step 508, then the process goes to step 509. If the H-scaling factor has not been detected in step 507, the process goes back to step 506 and continues H-scale detection. Step 509 is a step to detect V-scaling factor from the detected image, which is performed by the scale detector 201 shown in FIG. 2. Step 510 is a conditional branch. If the V-scaling factor has been detected in step 509, the detected V-scaling factor is set to be a new V-scaling factor in step 511, then the process goes back to step 503 and performs the detection of electronic watermarks assuming that the scaling is performed with the detected H-scaling factor and V-scaling factor. If the V-scaling factor has not been detected in step 510, the process goes back to step 509 and continues V-scale detection.

Figure 6:
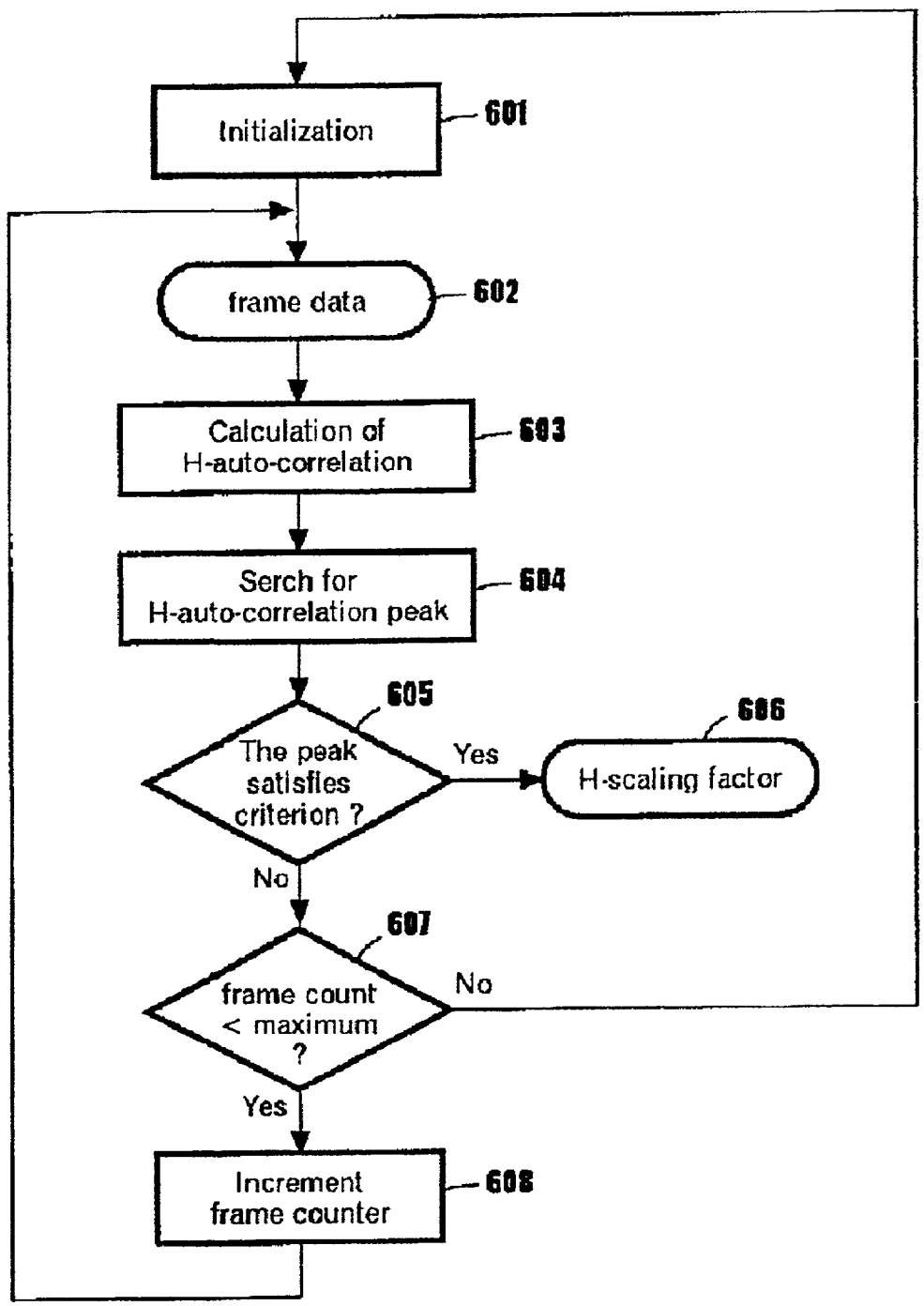
FIG. 6 depicts an example of a flowchart of the processing of detecting a horizontal scaling factor.

An example flowchart for detecting horizontal scaling factor is now described. FIG. 6 depicts the flowchart of the processing of detecting H-scaling factor (i.e., horizontal scaling factor) performed by the scale detector. This processing is performed in block 201 in FIG. 2. Step 601 is a step for initialization, where the frame counter is set to zero which will be referred to in steps 607 and 608. That is, the main processing of step 601 is to initialize the autocorrelation table that stores calculation results of autocorrelation.

In step 602, detected image data is obtained. More particularly, in case of static images, entire image data is obtained, while in case of moving images, one frame data is obtained.

In step 603, autocorrelation is calculated using the detected image data obtained in step 602, and then the autocorrelation table is updated. In step 604, an autocorrelation peak is searched among the autocorrelation table obtained in step 603. Step 605 is a conditional branch to determine whether the peak found in step 604 meets the condition of detection of scaling factors. If it meets the condition of detection, the scaling factor detected in step 606 is output.

In step 607, it is determined whether the number of accumulated frames exceeds the predetermined maximum frame number when the detected image is a moving image, wherein autocorrelation results of plural frames are accumulated to obtain the detection result of scaling factor with higher reliability. If the maximum frame number has not been exceeded, the process proceeds to step 608, while the number of accumulated frames exceeds the maximum frame number, the process proceeds to step 601 to initialize the frame counter and autocorrelation table.

In step 608, the frame counter is incremented by one to count the number of accumulated frames. Regarding the flowchart for detection of V-scaling factor (i.e., vertical scaling factor), one can consider similarly by replacing H with V in FIG. 6.

Figure 7:
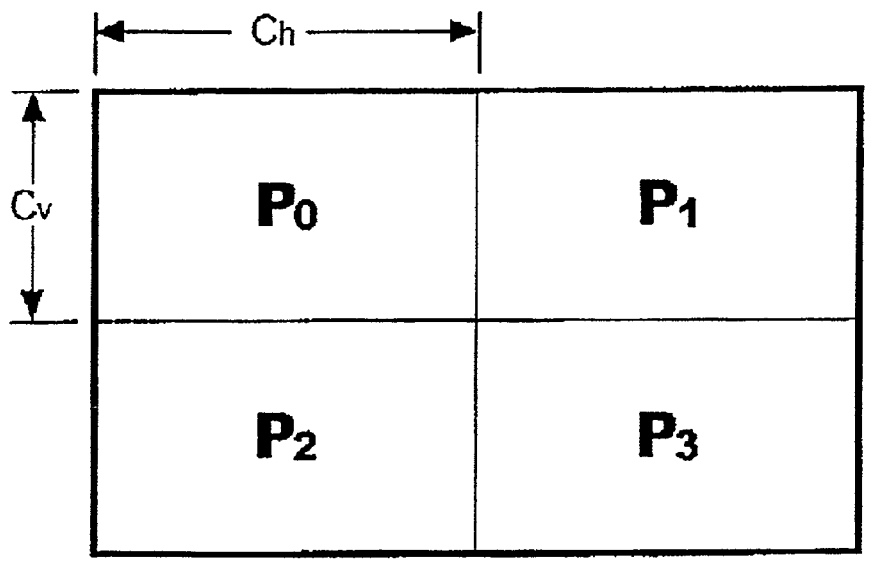
FIG. 7 depicts an example of repetition of embedded patterns.

An embedded pattern format for detection of scaling factors is now described. The present invention can detect scaling factors by detecting repetition of embedded patterns of embedded data using autocorrelation calculation, rather than by embedding particular patterns for registration by superimposing them on patterns for embedded data. Therefore, as shown in FIG. 7, the embedded patterns should be composed of at least two time repetition of the same pattern in the direction of detection for scaling. FIG. 7 depicts the idea of repeating the embedded pattern twice in the horizontal and vertical directions respectively in order to detect the scaling factor, wherein the embedded pattern is appended to one plane of embedded image. In this case, the following relation is established.

$$P0[x][y]=P1[x+ch][y]=P2[x][y+cv]=P3[x+ch][y+cv]$$

The actual embedded pattern should be changed depending on the original image subject to embedding so as not to be perceived by a person. However, correlation among repetitive patterns should be maintained. That is, the following relation is established.

$$P0 \approx P1 \approx P2 \approx P3$$

As a variation of repetition of embedded patterns, repetition of negative patterns is also possible. That is, repetitive patterns can have the following relation such as P0=−P1, P0=−P2, P2=−P3.

Figure 8:
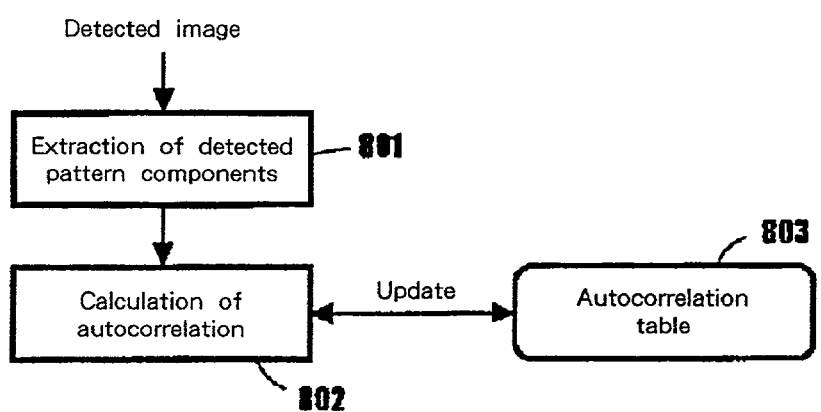
FIG. 8 depicts an example of a block diagram showing an overview of calculation of autocorrelation in the horizontal and vertical directions.

An example of a calculation of autocorrelation in the horizontal and vertical directions is now described. FIG. 8 depicts a block diagram showing an overview of the calculation of autocorrelation in the horizontal and vertical directions. This corresponds to step 603 in FIG. 6. In block 801, the embedded pattern components extracting section extracts the associated components of the detected pattern from the detected image using filtering processing or the like. In block 802, the autocorrelation calculating section calculates the autocorrelation in every detection step of scaling, with receiving the associated components of the detected pattern as input, and updates the autocorrelation table based on its results. The detection step of scaling differs depending on whether the input detected image is digital data (i.e., baseband data) or compressed data (e.g., MPEG, JPEG, etc.). The method for updating the autocorrelation table is, for example, to add to the past results of autocorrelation. In block 803, the autocorrelation calculation table stores calculation results of autocorrelation in every detection step of scaling and is used in step 604 in FIG. 6 to search for autocorrelation peaks.

Figure 9:
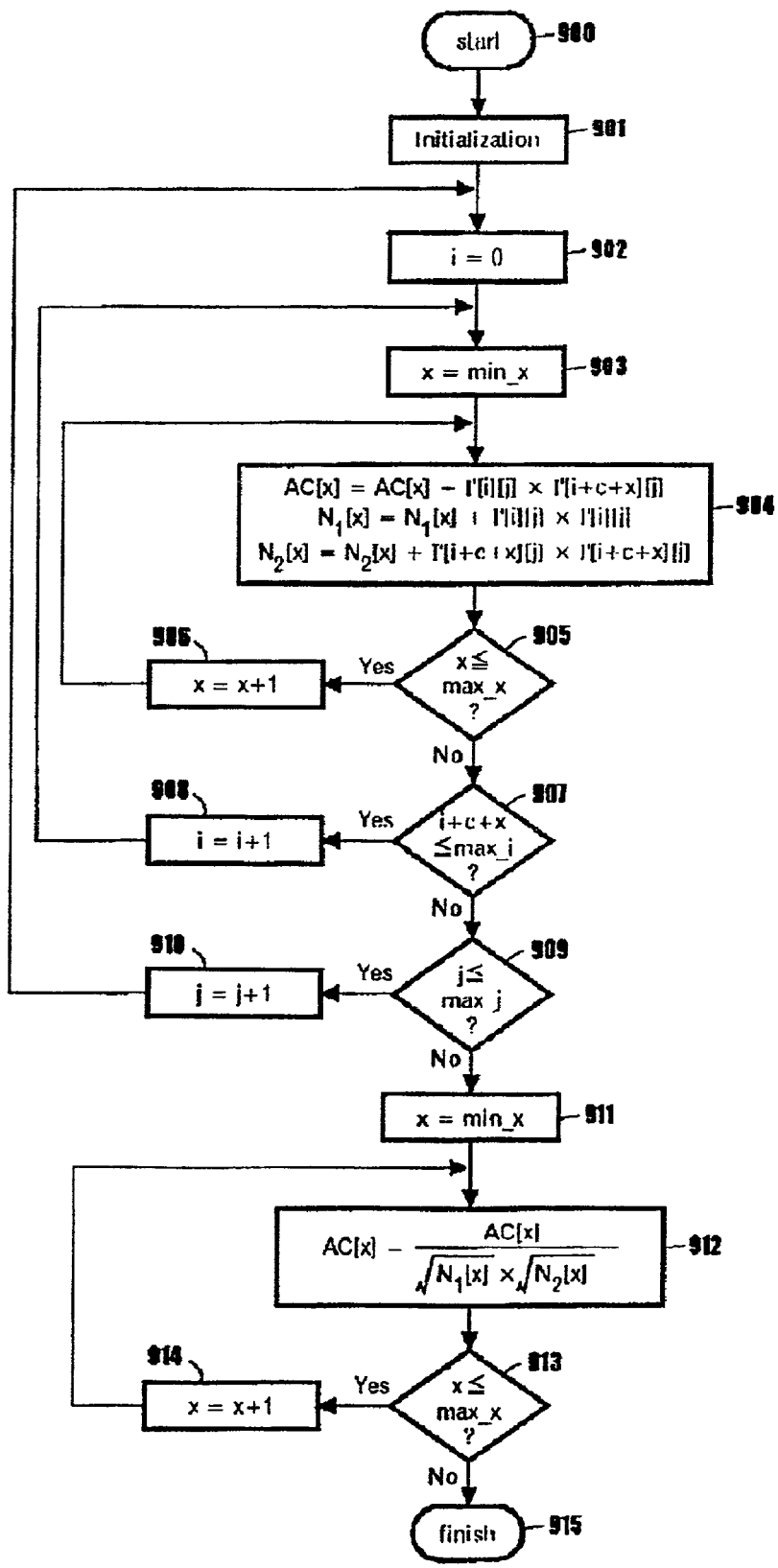
FIG. 9 depicts an example of a flowchart of calculation of autocorrelation when the detected data is baseband data.

An example of a calculation of autocorrelation for baseband data is now described. FIG. 9 depicts a flowchart of block 802 in FIG. 8, i.e., calculation of autocorrelation, when the detected data is baseband data.

In step 901, initialization is performed, where j=0 as well as AC[x]=0, N1[x]=0, N2[x]=0 (x=min_x to max_x) is performed. Note that min_x is a negative value to find a reduction scaling factor, while max_x is a positive value to find an enlargement scaling factor. Steps 902 through 910 serve to calculate an autocorrelation value AC[x] and normalization factors N1[x] and N2[x] prior to normalization. This enables to detect scaling factors ranging from (c+min_x)/c to (c+max_x)/c by the step of 1/c. Note that I'[i][j] is a pixel value of ith row and jth column of the detected image, from which detected pattern components have been extracted, c is a repetition period of the embedded pattern (e.g., ch or cv in FIG. 7), max_i is a maximum of i, and max_j is a maximum of j. Steps 911 through 914 serve to normalize the autocorrelation value AC[x] in every detection step x of scaling. According to the aforementioned processing, the calculation result of autocorrelation represented by the following equation is obtained.

$$AC(x) = \frac{\sum_{j=0}^{max\_j} \sum_{i=0}^{max\_i'} I'[i][j] \times I'[i+c+x][j]}{\sqrt{\sum_{j=0}^{max\_j} \sum_{i=0}^{max\_i'} I'[i][j]^2} \sqrt{\sum_{j=0}^{max\_j} \sum_{i=0}^{max\_i'} I'[i+c+x][j]^2}}$$ [Equation 6]

where max_i'=max_i−c−max_x. Regarding this processing, what results from omitting the normalization processing, i.e., the following equation is able to be substituted for calculation results of autocorrelation.

$$A(C(x))' = \sum_{j=0}^{max\_j} \sum_{i=0}^{max\_i'} I'[i][j] \times I'[i+c+x][j]$$ [Equation 7]

Search for autocorrelation peak for baseband data: This processing corresponds to step 604 in FIG. 6 when input data is baseband data, wherein a peak value is searched among autocorrelation values AC[x] found in FIG. 9. When a positive correlation exists between adjacent repetitive patterns (i.e., the relation of P0=P1 is established in an example of FIG. 7), x=xpeak is searched which maximizes AC[x]. On the other hand, when a negative correlation exists between adjacent repetitive patterns (i.e., the relation of P0=−P1 is established in an example of FIG. 7), x=xpeak is searched which minimizes AC[x]. The scaling factor obtained by xpeak is given by the following equation.

$$\text{scaling\_factor} = \frac{c + x_{peak}}{c}$$ [Equation 8]

An example of an embedded pattern format for detecting scaling factors from compressed data is now described. In MPEG or JPEG domain, images are recorded after divided into blocks of 8×8 pixels and then performed DCT. Therefore, processing similar to the case of baseband data is possible if performing inverse transform on DCT data. However, as the processing of inverse transform is expensive, it is necessary to enable detection of scaling factors without inverse transform. An electronic watermark format for detecting scaling factors from compressed data has the following natures. That is, an appearance of peaks of autocorrelation differs depending on misalignment of pixels. This makes the detection accuracy of scaling factors finer than a block unit.

Figure 10:
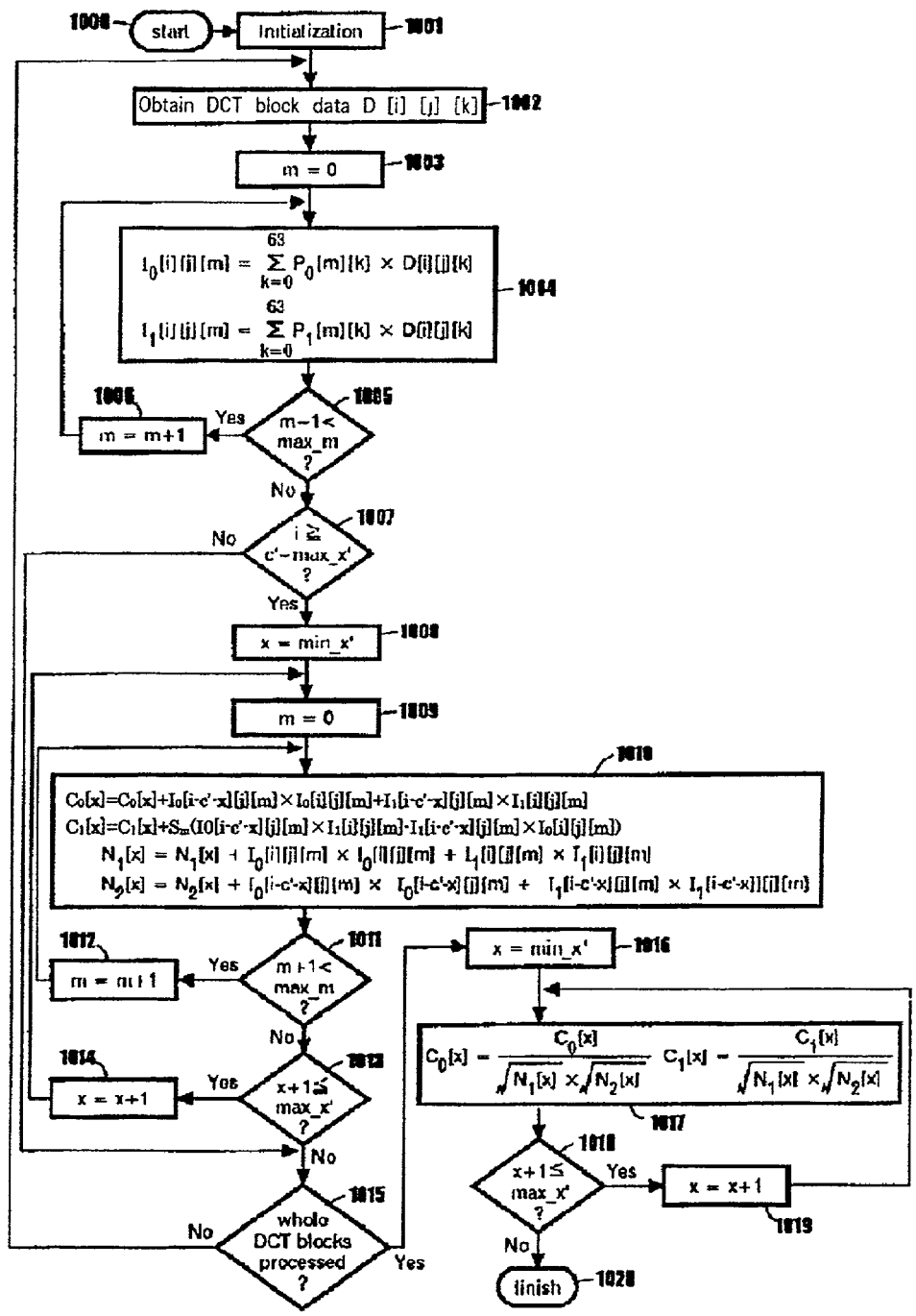
FIG. 10 depicts an example of a flowchart calculation of autocorrelation when the detected data is compressed data.

An example of a calculation of autocorrelation for compressed data is now described. FIG. 10 depicts a flowchart of block 802 in FIG. 8, i.e., calculation of autocorrelation, when the detected data is compressed data. This processing is performed in block 801.

In step 1001, initialization is performed, where C0[x], C1[x], N1[x], N2 [x] (min_x'≦x≦max_x') are reset. The detecting range of scaling factors is from 1+min_x'/c' to 1+max_x'/c', wherein min_x' needs to be negative value to find reduction scaling factor. c' is a repetition period of embedded patterns (i.e., ch or cv in FIG. 7) which is represented by the number of DCT blocks.

In step 1002, the compressed data is parsed to obtain DCT coefficients D[i][j][k](0≦k≦63) of unprocessed DCT blocks and their block coordinates i, j, which represent coordinates of a DCT block unit. Steps 1003 through 1006 serve to calculate an inner product of obtained DCT block coefficients and base block patterns, wherein P0[m][k] and P1[m][k] represent coefficients resulting from DCT transform of the tuple of base block patterns, and max_m represents the number of tuples of base block patterns. Steps 1007 through 1015 serve to calculate autocorrelation values C0[x] and C1[x] prior to normalization as well as normalization factors N1[x] and N2[x], using the calculation results of inner products obtained in step 1004, wherein sm takes a value of 1 or −1 which is determined by the tuple of base block patterns. Steps 1016 through 1019 serve to normalize the autocorrelation values obtained from steps 1007 through 1015 for a detection step x of each scaling factor.

Figure 12:
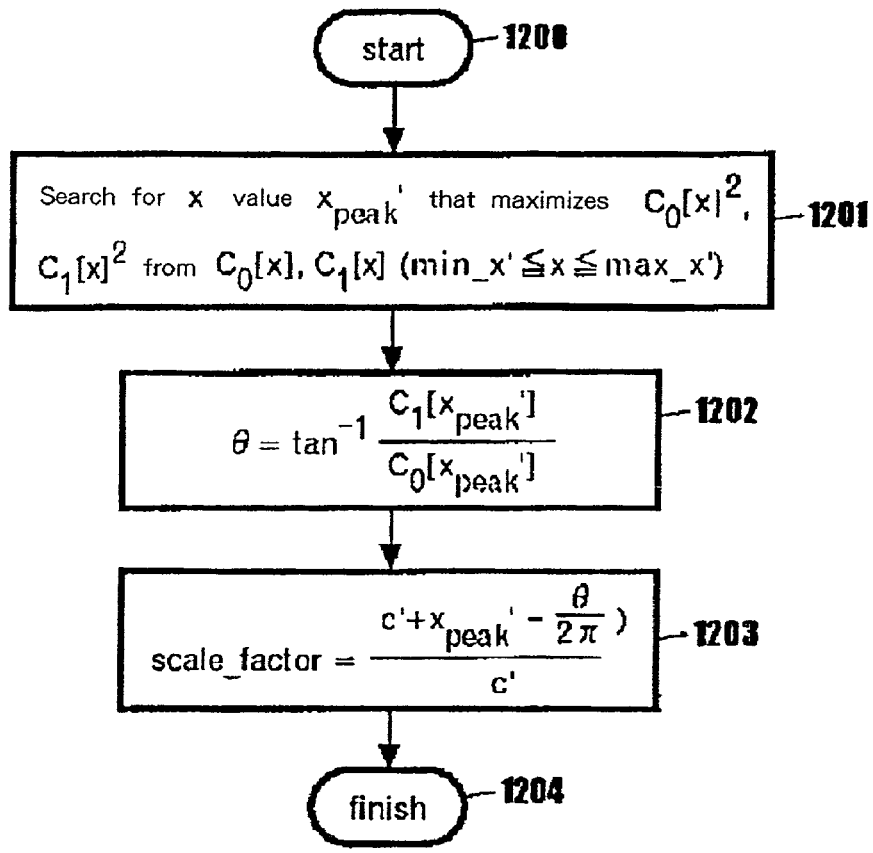
FIG. 12 depicts an example of a flowchart of searching for an autocorrelation peak for compressed data.

An example of a search for autocorrelation peak for compressed data is now described. FIG. 12 depicts a flowchart of step 604 in FIG. 6, i.e., search for H-autocorrelation peak for compressed data.

In step 1201, x value xpeak' that maximizes the magnitude of C0[x], C1[x] is found among C0[x], C1[x] (min_x'≦x≦max_x').

In step 1202, a phase θ of C0[xpeak'], C1[xpeak'] is calculated.

In step 1203, a scaling factor is found from obtained xpeak' and θ. Note that the equation shown in FIG. 12 is no more than one example and differs depending on the used base block patterns.

Figure 13:
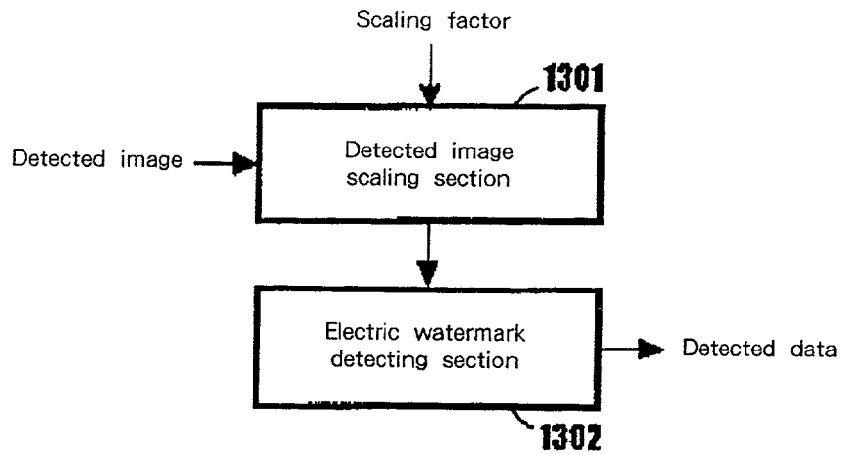
FIG. 13 represents an example of a method for detecting electronic watermarks by modifying detected images based on input scaling factors.
Figure 14:
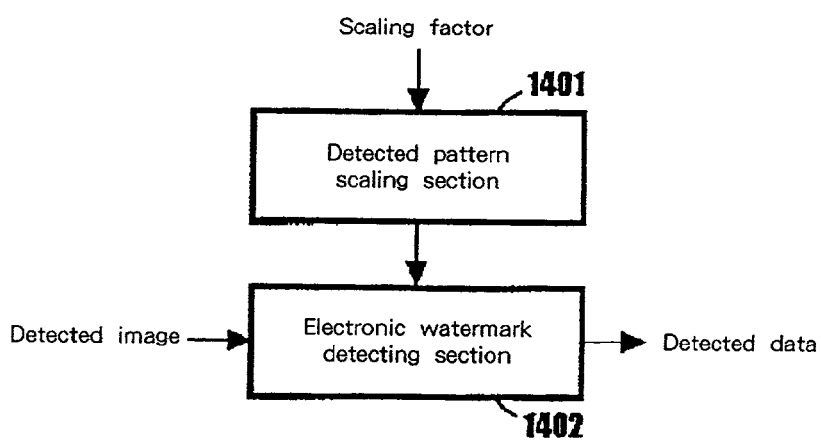
FIG. 14 represents an example of a method for detecting electronic watermarks by modifying detected patterns depending on scaling factors of detected images.

An example of a detection of electronic watermarks based on scaling factors (Scaled WM detector) is now described. FIG. 13 and FIG. 14 depict an overview of block 202 in FIG. 2, i.e., Scaled WM detector. FIG. 13 represents a method for detecting electronic watermarks by modifying detected images based on input scaling factors. FIG. 14 represents a method for detecting electronic watermarks by modifying detected patterns depending on scaling factors of detected images. Detected image scaling section 1301 scales and outputs detected images for input data depending on scaling factors for input data. The detected image scaling section 1301 performs the processing to modify the detected images that were transformed by the scaling processing 102. Then, electronic watermark detecting section 1302 receives the detected images that have been scaled in the detected image scaling section 1301, then detects electronic watermarks, and outputs the results as detected data. Though the method for detecting electronic watermarks depends on the scheme of electronic watermarks, input images are processed assuming that they haven't undergone scaling processing (102). On the other hand, detected pattern scaling section 1401 scales and outputs detected patterns depending on scaling factors for input data. If input scaling factors are within a limited range, this processing can be replaced with what selects and outputs the detected patterns that correspond to the input scaling factors, by preparing the detected patterns that have been scaled in advance. Then, electronic watermark detecting section 1402 receives the detected patterns that have been scaled by the detected pattern scaling section 1401, scaling factors, and detected images, then detects the electronic watermarks and outputs the results as detected data. Again, the method for detecting electronic watermarks depends on the scheme of electronic watermarks. Unlike the scheme of FIG. 13, the detected patterns have been scaled in FIG. 14, thus it is necessary to take a correspondence with unscaled detected patterns using the input scaling factors. For example, when the scaling factors are si and sj, ith and jth results would be treated as i/si-th and j/sj-th results.

As description is now given for an example of detected image's DCT blocks and detected pattern blocks when reduced in horizontal and vertical directions.

Figure 15:
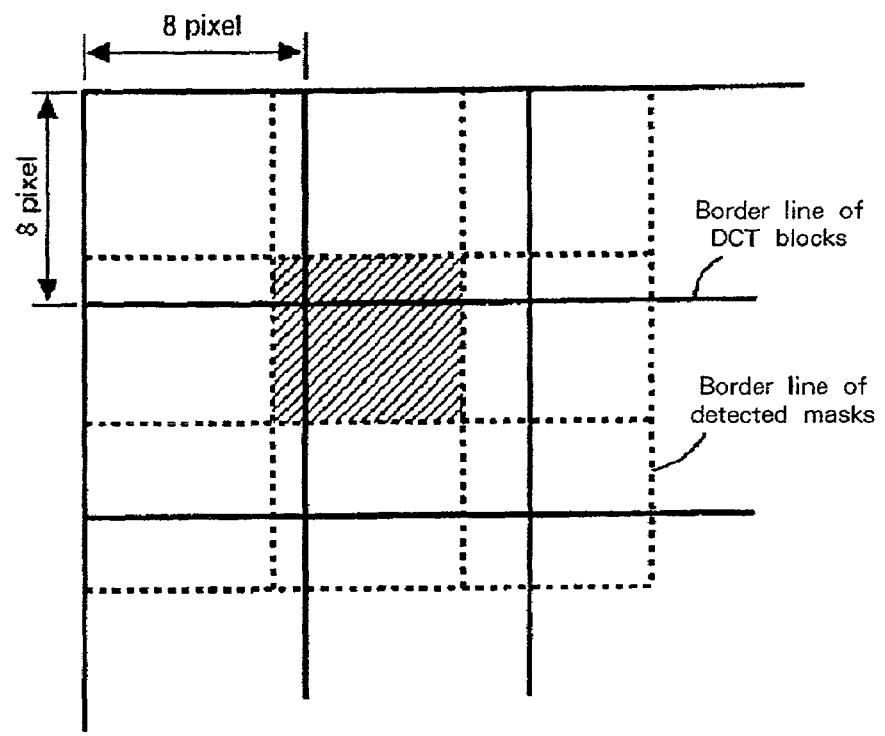
FIG. 15 schematically depicts an example of a relation between detected image's DCT blocks and detected pattern blocks.

Upon detection from compressed data such as MPEG or JPEG, input data is given as DCT block data of 8×8 pixels. A method such as performing an inverse transform on DCT coefficients of DCT blocks and treating it as baseband data is inconvenient in terms of cost. When the detected images haven't undergone the scaling processing 102, it is possible to detect directly from DCT blocks by dividing the detected patterns also into blocks of 8×8 pixels and performing detection processing for every block. However, when the detected images have undergone the scaling processing 102, there occurs a mismatch between DCT blocks and detected pattern blocks. FIG. 15 schematically depicts a relation between detected image's DCT blocks and detected pattern blocks for compressed data such as MPEG or JPEG, when the detected images have undergone reduction processing by the scaling processing 102. As the detected images have been reduced, reduced detected patterns have to be used. Detected pattern blocks, which are divided corresponding to when the detected images haven't undergone the scaling processing 102, become smaller than 8×8 pixels in size, hence there occurs a mismatch with DCT blocks that are obtained by parsing the compressed data. As shown in FIG. 15, one DCT block is to include plural detected pattern blocks. When detecting from DCT blocks without performing inverse DCT, detection processing of electronic watermarks has to be performed for each of plural detected pattern blocks included in one DCT block. When detecting electronic watermarks using the method shown in FIG. 13 after inverse DCT processing, it is unnecessary to consider that there are plural detected patterns in this DCT blocks.

Figure 16:
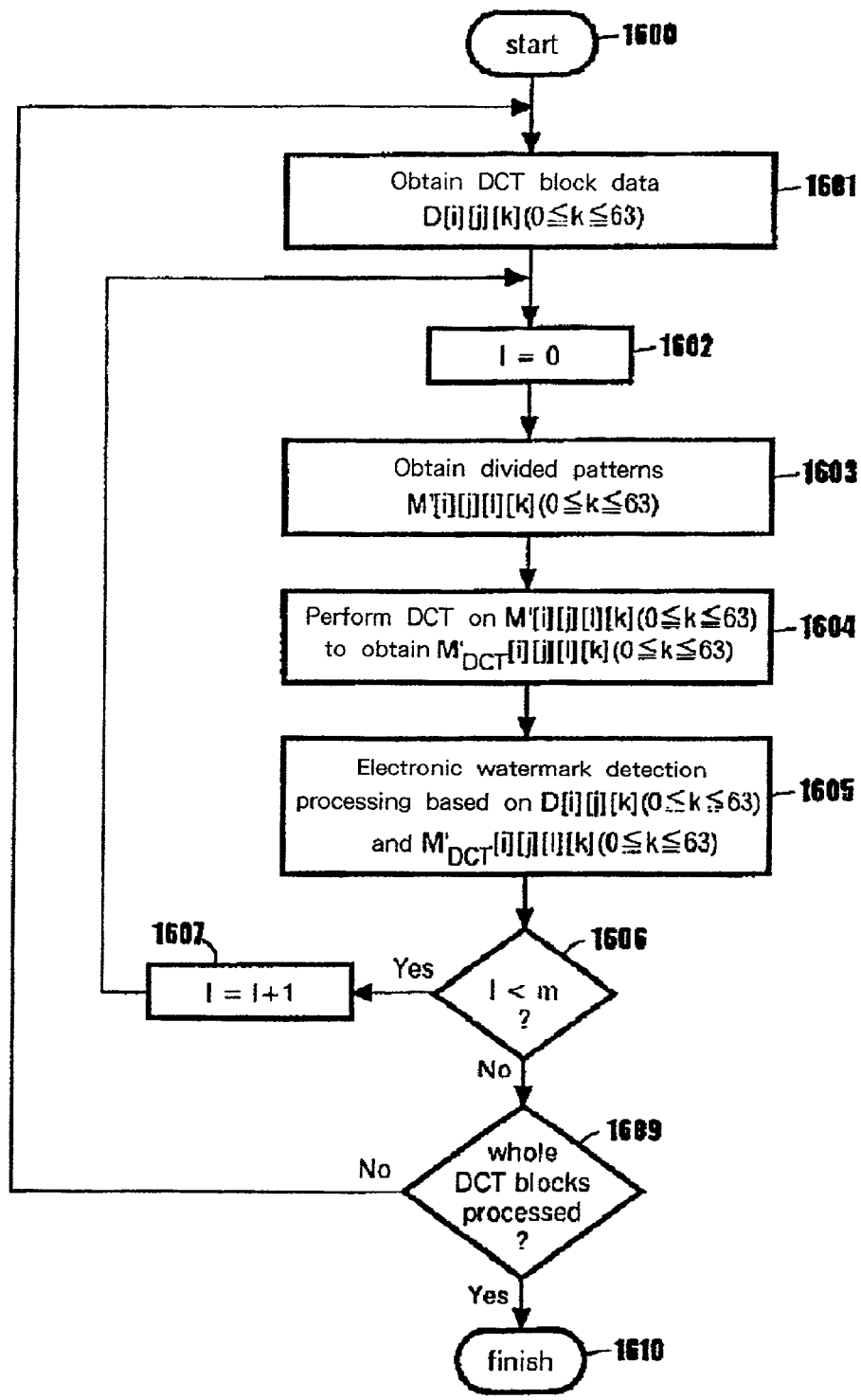
FIG. 16 depicts an example of processing performed in electronic watermark detecting section for each DCT block for compressed data.

An example of detection of electronic watermarks based on scaling factors for compressed data is now described referring to FIG. 16. FIG. 16 depicts processing performed in electronic watermark detecting section 1402 for each DCT block for compressed data such as MPEG or JPEG. In order to detect directly from detected images that have undergone DCT (i.e., without performing inverse DCT), FIG. 16 uses the method for scaling the detected patterns shown in FIG. 14. In step 1601, compressed data is parsed to obtain coefficients of unprocessed DCT blocks, where i and j are coordinates of DCT blocks.

In step 1602, an index of division is initialized to 0 in order to process each of m parts in sequence divided by the detected pattern blocks in a DCT block in processing.

In step 1603, a pattern corresponding to the DCT block and its division index 1 (i.e., divided pattern) is obtained from a detected pattern corresponding to the scaling factor of the detected image.

In step 1604, the divided pattern $M'[i][j][l][k](0 \leq k \leq 63)$ obtained in step 1603 undergoes DCT processing, thereby resulting in $M'_{DCT}[i][j][l][k](0 \leq k \leq 63)$. As DCT processed divided patterns have been prepared in advance, when the pattern obtained in step 1603 matches the DCT processed divided pattern, this processing is unnecessary.

Figure 17:
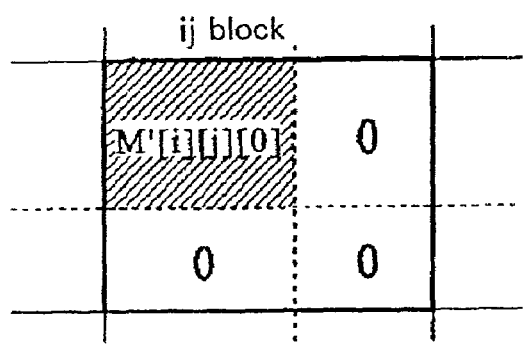
FIG. 17 depicts an example of a relation between DCT blocks and divided patterns.
Figure 17:
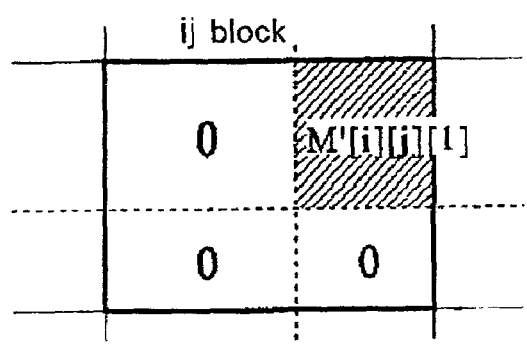
Figure 17:
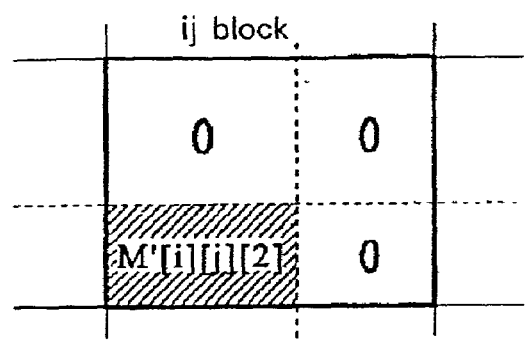
Figure 17:
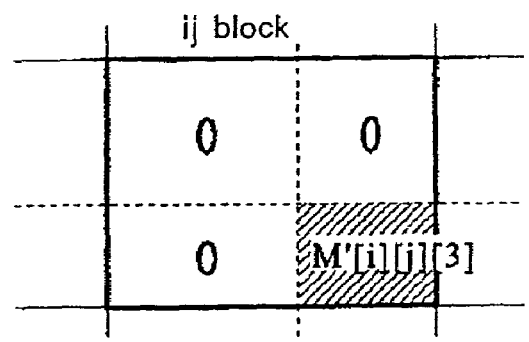

In step 1605, detection processing of electronic watermarks is performed using the DCT blocks obtained in step 1601 and the divided patterns obtained in step 1604. The detection processing of electronic watermarks depends on the scheme of electronic watermarks. Step 1606 is a conditional branch, which proceeds to step 1609 when all divided patterns have been processed and finishes the detection processing of electronic watermarks of this block. Otherwise, the process proceeds to step 1607 to increment 1 by one to process the next divided pattern. FIG. 17 depicts a relation between DCT blocks D[i][j] and divided patterns M'[i][j][l], wherein a DCT block is divided into four parts by the detected pattern blocks. Values of patterns other than a divided pattern are set to 0.

Figure 18:
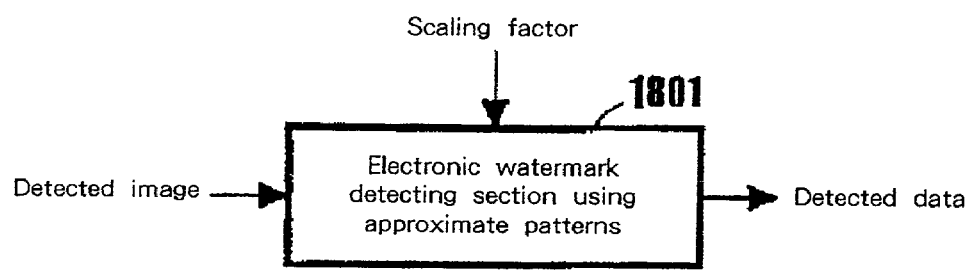
FIG. 18 depicts an example of a detection method that does not scale detected images or detected patterns.

An example of detection of electronic watermarks based on scaling factors using approximate patterns is described referring to FIG. 18. FIG. 18 depicts a detection method that does not scale detected images or detected patterns. When the scaling factor is close to 1.0, the detected patterns are divided into blocks and then each block is associated with an approximate pattern so as to reduce misalignment, without performing the scaling of detected images or detected patterns shown in FIG. 13 or FIG. 14 respectively. Electronic watermark detecting section 1801 outputs the detected data based on the scaling factors and detected images for input data.

Figure 19:
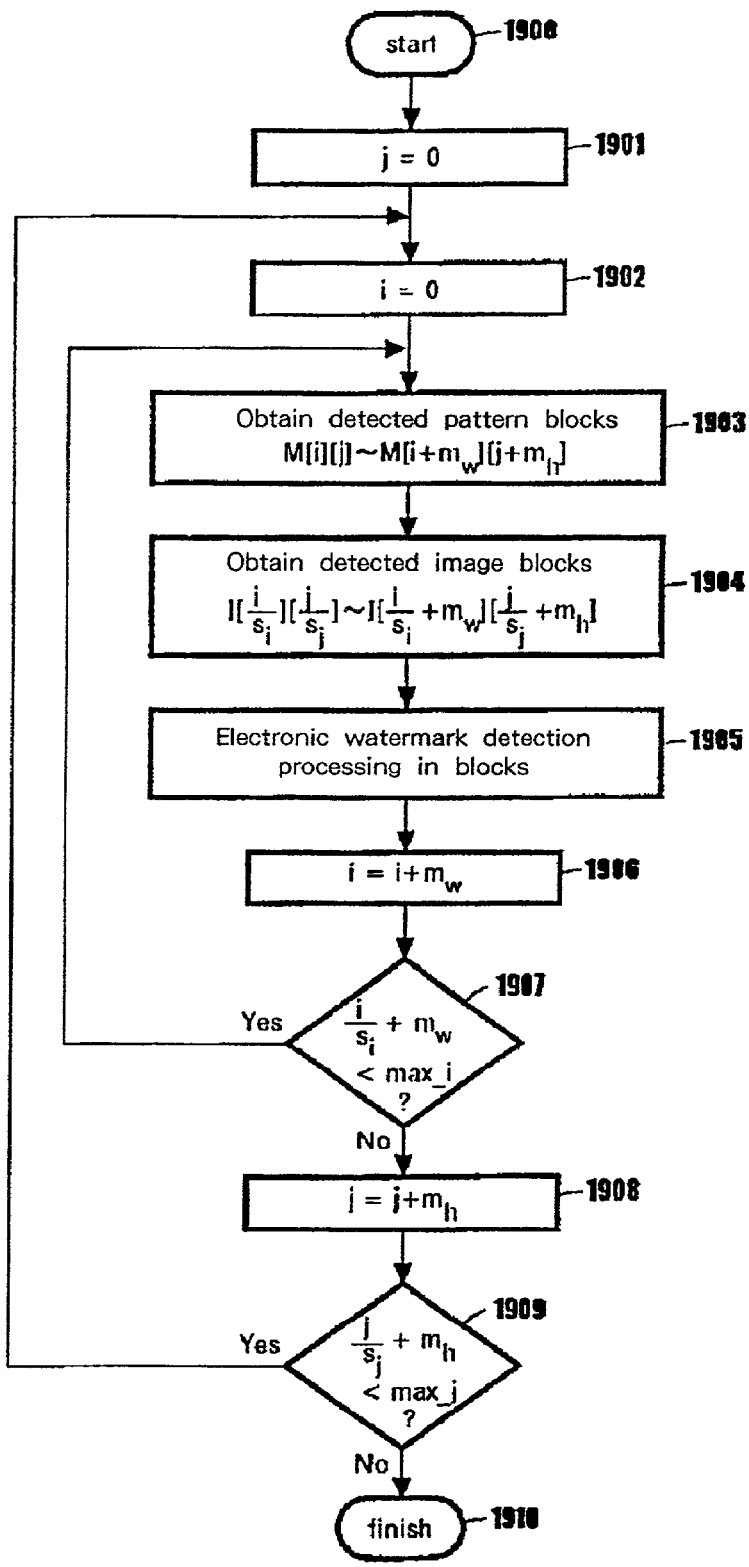
FIG. 19 depicts an example of processing performed in electronic watermark detecting section using approximate patterns.

An example of detection of electronic watermarks for baseband data using approximate patterns is now described. FIG. 19 depicts processing performed in block 1801, i.e., electronic watermark detecting section using approximate patterns, when image data is baseband data. Assuming that detected patterns are equally divided into parts that have mh in width and mw in height.

In step 1901, a variable j is set to 0.

In step 1902, a variable i is set to 0.

In step 1903, a detected pattern block is obtained which has a coordinate (i,j) as a vertex and mw in width and mh in height.

In step 1904, a detected image block is obtained, which corresponds to the detected pattern having vertex (i,j) obtained in step 1903. The detected image block obtained is what has a coordinate (i/si, j/sj) as a vertex and mw in width and mh in height. Note that si is a scaling factor in i coordinate direction, while sj is a scaling factor in j coordinate direction.

In step 1905, detection processing of electronic watermarks is performed using the detected pattern block obtained in step 1903 and the detected image block obtained in step 1904.

In step 1906, i is incremented by the width of mw to proceed to process a next detected pattern block.

In step 1907, it is determined whether the width of the detected image (max_i) has been exceeded or not.

In step 1908, j is incremented by the height of mh to proceed to process a next detected pattern block.

In step 1909, it is determined whether the height of the detected image (max_j) has been exceeded or not.

Figure 20:
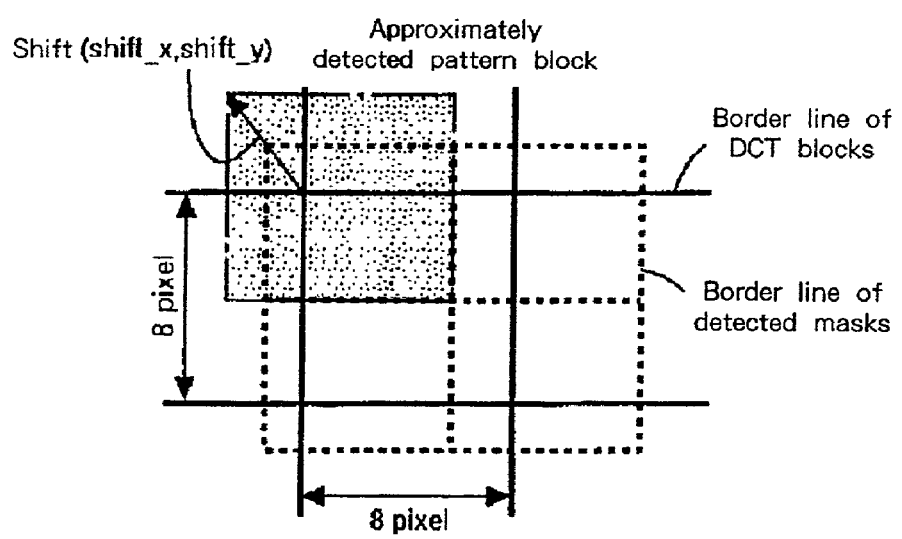
FIG. 20 is an example of a diagram illustrating a shift of an approximately detected pattern block.
Figure 21:
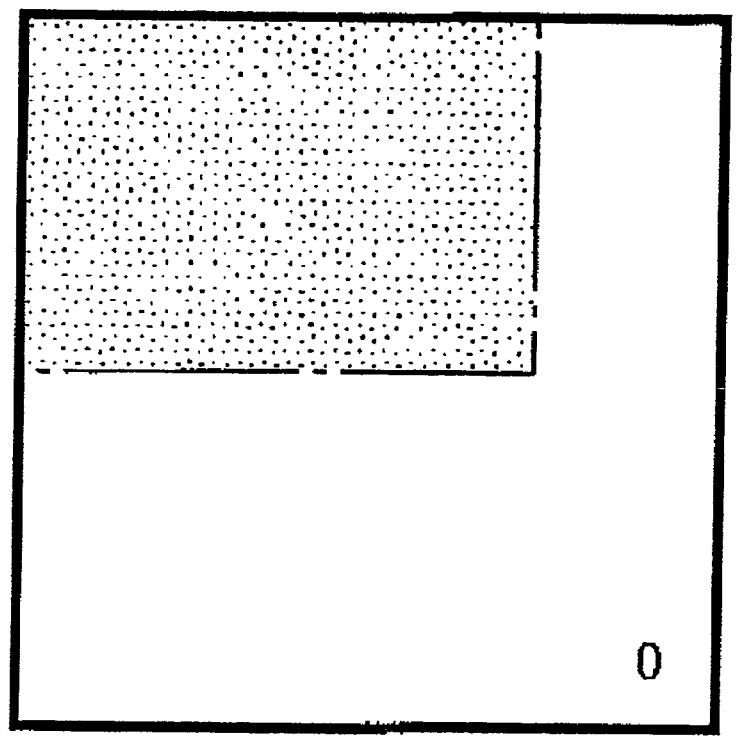
FIG. 21 is an example of a diagram applying a shifted approximately detected pattern block to compressed data.

Detected image's DCT blocks and approximately detected pattern blocks when reduced in horizontal and vertical directions:

When detected images are compressed data such as MPEG or JPEG, one DCT block included in image data that has been scaled (102) is divided into plural detected pattern blocks, as shown in FIG. 15. When applying the electronic watermark detecting method shown in FIG. 18 that uses approximate patterns to compressed data, detection is performed by shifting the pattern as shown in FIG. 20, then applying that pattern to each division as shown in FIG. 21. This allows reducing the number of divided patterns that have to be prepared in advance.

Figure 22:
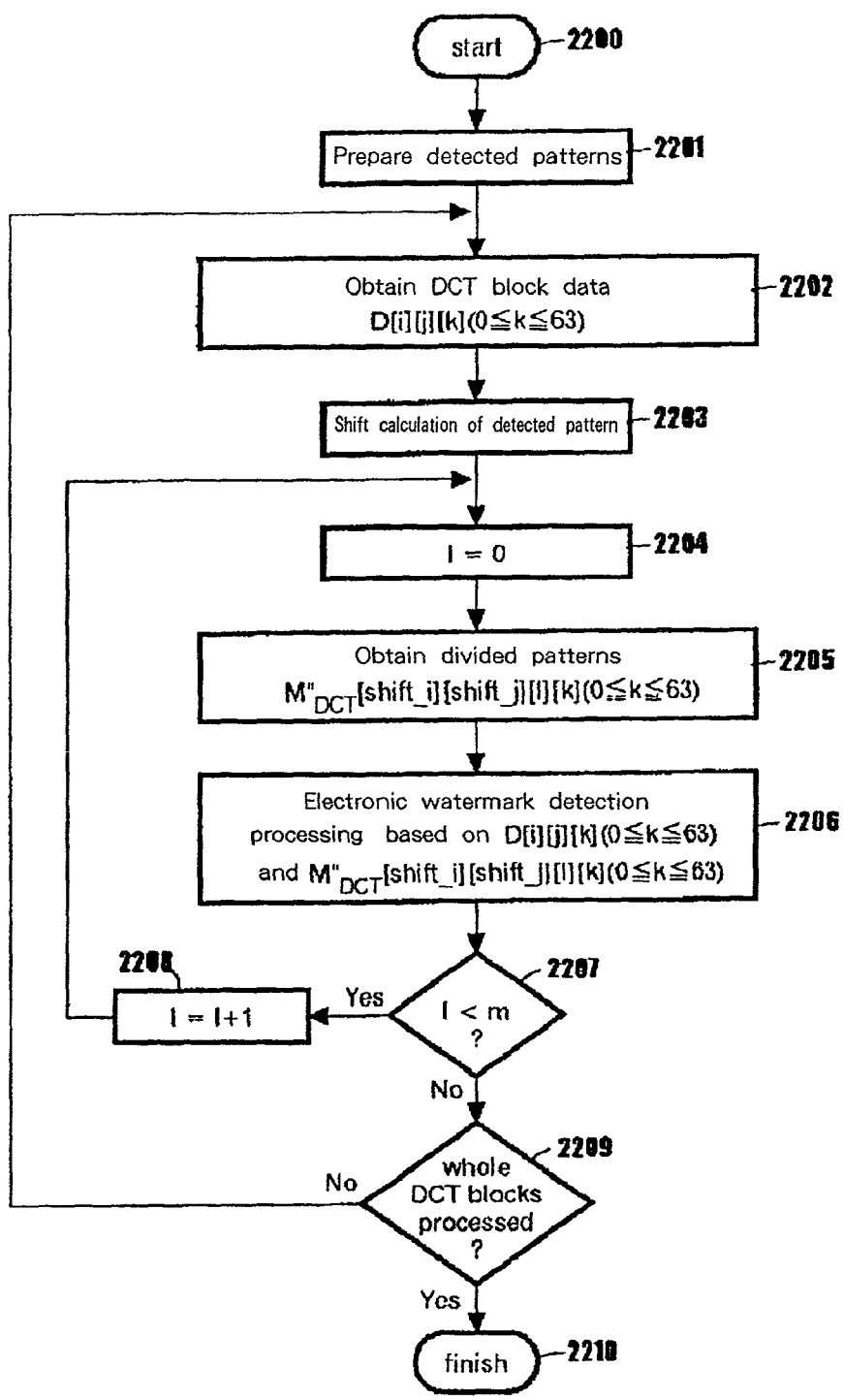
FIG. 22 depicts an example of processing performed in electronic watermark detecting section using approximate patterns, for compressed data.

An example of an approximate detection of electronic watermarks based on scaling factors for compressed data is described referring to FIG. 22. FIG. 22 depicts processing performed in block 1801, i.e., electronic watermark detecting section using approximate patterns, for compressed data such as MPEG or JPEG.

In step 2201, divided patterns as shown in FIG. 21 are generated in advance corresponding to 64(=8×8) kinds of shifts and each division, then performing DCT processing and storing them in the pattern buffer $M''_{DCT}[\text{shift\_i}][\text{shift\_j}][l][k](0 \leq \text{shift\_i} \leq 8, 0 \leq \text{shift\_j} \leq 8, 0 \leq l < m, 0 \leq k \leq 63)$.

In step 2202, compressed data is parsed to obtain coefficients of unprocessed DCT blocks, where i and j are coordinates of the DCT block.

In step 2203, a coordinate (i, j) of the block and scaling factors (si, sj) are received and shift mounts (shift_i, shift_j) of the detected pattern are calculated. FIG. 20 depicts an example of shift amount for upper left division.

In step 2204, an index of division is initialized to 0 in order to process each of m parts in sequence divided by detected pattern blocks in a DCT block in processing.

In step 2205, DCT processed detected patterns (i.e., divided patterns) $(M''_{DCT}[\text{shift\_i}][\text{shift\_j}][l][k](0 \leq k \leq 63))$ are obtained based on the coordinate (i, j) of DCT block and shift amounts (shift_i, shift_j) of the detected pattern.

In step 2206, detection processing of electronic watermarks is performed using the DCT blocks obtained in step 2202 and the divided patterns obtained in step 2205. The detection processing of electronic watermarks depends on the scheme of electronic watermarks. Step 2207 is a conditional branch, which proceeds to step 2209 when all divided patterns have been processed and finishes the detection processing of electronic watermarks of this block. Otherwise, the process proceeds to step 2208 to increment 1 by one to process the next divided pattern.

In step 2209, it is determined whether all the DCT blocks have been processed.

Figure 23:
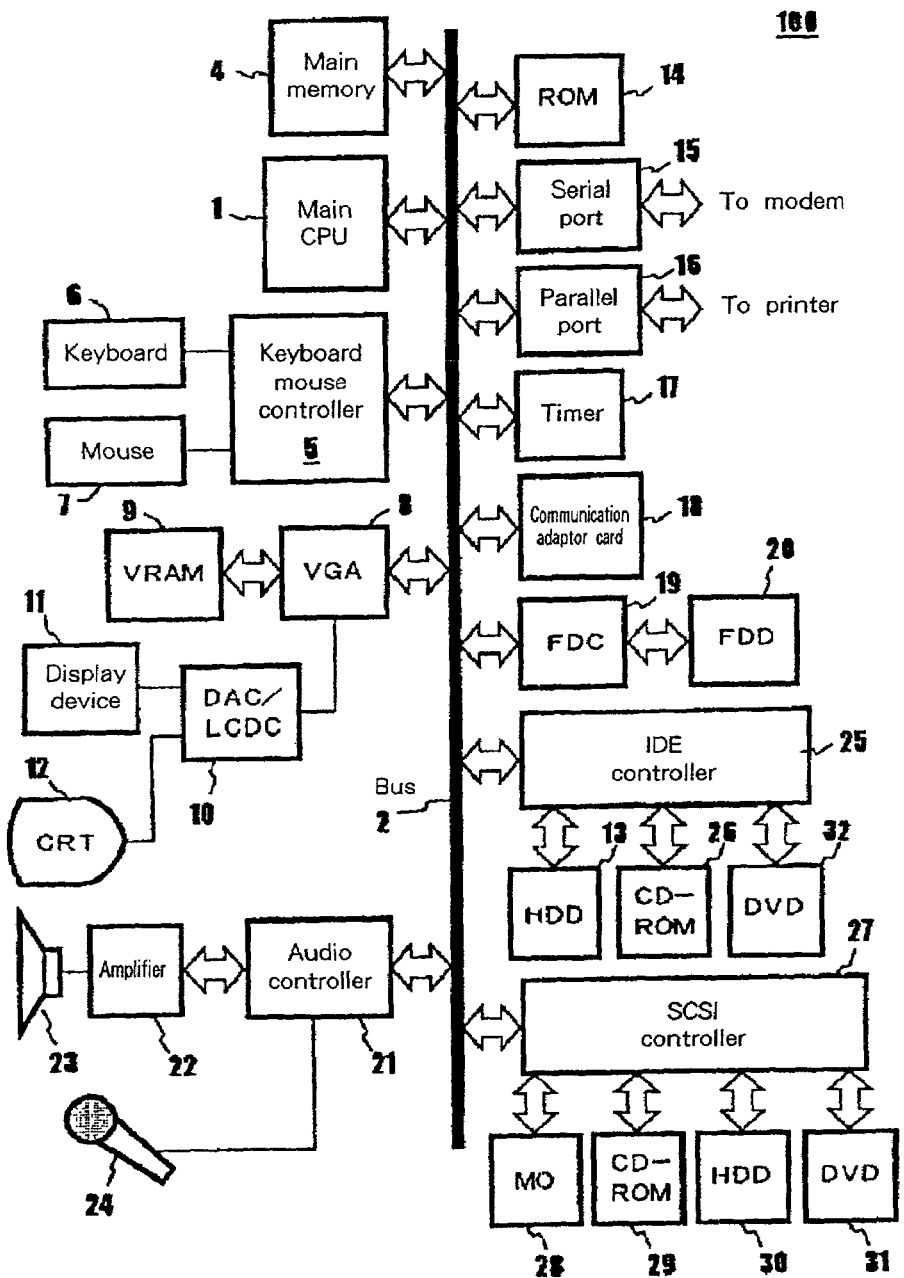
FIG. 23 depicts an example embodiment of hardware configuration of an electronic watermark embedding/detecting system.

Hardware configuration of embedding/detecting system: FIG. 23 depicts one embodiment of hardware configuration of an electronic watermark embedding/detecting system used in the present invention. A system 100 includes central processing unit (CPU) 1 and memory 4. CPU 1 and memory 4 are connected to hard disk drive 13 as auxiliary storage (or storage media drives such as CD-ROM 26 and DVD 32) via bus 2 through IDE controller 25. Likewise, CPU 1 and memory 4 are connected to hard disk drive 30 as auxiliary storage (or storage media drives such as MO 28, CD-ROM 29 and DVD 31) via bus 2 through SCSI controller 27. Floppy disk drive 20 is connected to bus 2 via floppy disk controller 19.

A floppy disk is inserted into floppy disk drive 20. On this floppy disk, hard disk drive 13 (or storage media such as CD-ROM 26 and DVD 32) and ROM 14 are recorded computer programs and embedding/detecting programs that cooperate with the operating system to give instructions to CPU to implement the present invention, as well as operating system's codes or data, those of which are loaded into memory 4 to be executed. It is also possible to compress those codes of computer programs or divide them into plural pieces to record them on plural recording media.

System 100 further includes a user interface hardware, thereby being able to have a pointing device 7 (mouse, joystick, etc.) or keyboard 6 for inputting, and a display 12 for displaying the results of electronic watermarks. It is also possible to connect a printer via parallel port 16 or modem via serial port 15. This system 100 can also connect to a network via serial port 15 and modem or communication adaptor 18 (Ethernet or token-ring card) and communicate with other computers and servers to take in digital data and embedded patterns for electronic watermarks from the outside through the network. Alternatively, one can connect a remote transmitter-receiver to serial port 15 or parallel port 16 to send and receive data via infrared rays or radio waves.

Speaker 23 receives sounds and audio signals via amplifier 22 that are D/A converted by audio controller 21, and outputs as sounds and voices. Audio controller 21 performs A/D conversion on voice information received from microphone 24 to take outside voice information into the system.

In this way, it should be understood that the system of the present invention is implemented by a typical personal computer (PC) or workstation, notebook PC, palmtop PC, network computer, various kinds of electric appliances such as TV with a computer built-in, game machine with communication facility, communication terminals including telephone, FAX, cellular phone, PHS, electronic notebook, etc., or combination thereof. It should be noted that these components are exemplification, wherein all of those components are not necessarily essential components of the present invention.

Thus, according to the present invention, there is provided methods, apparatus and systems for embedding and detecting electronic watermarks that is resistant to scaling and does not need signals for geometric compensation in addition to embedded information. Furthermore, it is possible to detect scaling factors in the horizontal and vertical directions independently, so that the electronic watermarks can be detected even if the aspect ratio changes.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after either or both of the following conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A method for performing an electronic watermark on digital data, comprising the steps of:
   preparing a digital embedded pattern having information that is to be embedded as an electronic watermark in digital data; and
   embedding said embedded pattern in said digital data at least twice or more repeatedly;
   wherein said embedded pattern has a tuple of base block patterns that are orthogonal to each other and has a repetitive pattern in the horizontal and/or vertical direction, and wherein the step of embedding employs a known repetition rate.

2. A method as recited in claim 1, wherein the step of embedding includes employing a known repetition rate.

3. A method as recited in claim 1, wherein the step of embedding is performed without requiring signals for geometric compensation.

4. An article of manufacture comprising a computer usable medium having computer readable program code means embodied therein for causing a watermark to be embedded, the computer readable program code means in said article of manufacture comprising computer readable program code means for causing a computer to effect the steps of claim 3.

5. A method for detecting an electronic watermark embedded in digital data, comprising the steps of:
   when detecting an embedded pattern that has a tuple of base block patterns that are orthogonal to each other and has been embedded in digital data at least twice or more repeatedly, finding a period having a maximum correlation by autocorrelation of said embedded repetitive pattern;
   detecting a scaling factor added to a frame from a change of said period; and
   detecting said embedded pattern using said scaling factor employing the repetition rate of the embedded pattern.

6. A method as recited in claim 5, wherein the step of detecting an embedded pattern includes employing a known repetition rate of said embedded pattern.

7. A method as recited in claim 5, wherein the step of detecting is performed without requiring signals for geometric compensation.

8. An article of manufacture comprising a computer usable medium having computer readable program code means embodied therein for causing a watermark to be detected, the computer readable program code means in said article of manufacture comprising computer readable program code means for causing a computer to effect the steps of claim 7.

9. The method of claim 5, wherein the digital data is scaled or compressed, and the step of detecting a scaling factor is performed on the scaled or compressed data without decompression of the digital data.

10. A method for performing an electronic watermark on digital data composed of plural frames, comprising the steps of:
    preparing a digital embedded pattern having information that is to be embedded as an electronic watermark in digital data; and
    embedding said embedded pattern in one of said frames at least twice or more repeatedly;
    wherein said embedded pattern has tuple of base block patterns that are orthogonal to each other and has a repetitive pattern in the horizontal or vertical direction.

11. The method according to claim 1 or claim 10, wherein the step of embedding comprises embedding said embedded pattern with alteration.

12. A method for detecting an electronic watermark embedded in digital data composed of plural frames, comprising the steps of:
    when detecting an embedded pattern that has a tuple of base block patterns that are orthogonal to each other and has been embedded in one of said frames at least twice or more repeatedly, finding a period having a maximum correlation by autocorrelation of the pattern in said one frame; and
    detecting a scaling factor added to the frame from a change of said period.

13. The method of claim 12, wherein the digital data is scaled or compressed, and the step of detecting a scaling factor is performed on the scaled or compressed data without decompression of the digital data.

14. A method comprising: performing an electronic watermark on MPEG data composed of plural frames, wherein said MPEG data is divided into intra blocks of 8×8 pixels in size and further performed DCT, including the steps of:
    preparing an embedded pattern having information that is to be embedded as an electronic watermark in said MPEG data, the embedded pattern being composed of a tuple of base block patterns of 8×4 pixels in size that are orthogonal to each other; and
    embedding said embedded pattern in one of said frames at least twice or more repeatedly;
    wherein said embedded pattern has a repetitive pattern in the horizontal or vertical direction.

15. A method for performing an electronic watermark on compressed digital data, comprising the steps of:
    preparing a digital embedded pattern having information that is to be embedded as an electronic watermark in digital data; and
    embedding said embedded pattern in said digital data at least twice or more repeatedly;

wherein said embedded pattern has a tuple of base block patterns that are orthogonal to each other and has a repetitive pattern in the horizontal or vertical direction, an autocorrelation peak of said repetitive pattern appearing differently when finding a scaling factor upon detection.

16. A method for detecting an electronic watermark embedded in compressed digital data, comprising the steps of:
  when detecting an embedded pattern that has a tuple of base block patterns that are orthogonal to each other and has been embedded in digital data at least twice or more repeatedly, finding a period having a maximum correlation by autocorrelation of said embedded pattern;
  detecting a scaling factor added to the digital data from a change of said period; and
  detecting information embedded in the digital data by applying a shift pattern prepared in advance to a detected block.

17. The method of claim 16, wherein the digital data is scaled or compressed, and the step of detecting a scaling factor is performed on the scaled or compressed data without decompression of the digital data.

18. A system for performing an electronic watermark on digital data, comprising:
  means for preparing a digital embedded pattern having information that is to be embedded as an electronic watermark in digital data; and
  means for embedding said embedded pattern in said digital data at least twice or more repeatedly;
  wherein said embedded pattern has a tuple of base block patterns that are orthogonal to each other and has a repetitive pattern in the horizontal or vertical direction.

19. The system according to claim 18, wherein the means for embedding comprises embedding said embedded pattern with alteration.

20. A computer program product comprising a computer usable medium having computer readable program code means embodied therein for causing a watermark to be embedded, the computer readable program code means in said computer program product comprising computer readable program code means for causing a computer to effect the functions of claim 18.

21. A system for detecting an electronic watermark embedded in digital data, comprising:
  when detecting an embedded pattern that has a tuple of base block patterns that are orthogonal to each other and has been embedded in digital data at least twice or more repeatedly, means for finding a period having a maximum correlation by autocorrelation of said embedded repetitive pattern;
  means for detecting a scaling factor added to the digital data from a change of said period; and
  means for detecting said embedded pattern using said scaling factor.

22. A computer program product comprising a computer usable medium having computer readable program code means embodied therein for causing a watermark to be detected, the computer readable program code means in said computer program product comprising computer readable program code means for causing a computer to effect the functions of claim 21.

23. The method of claim 21, wherein the digital data is scaled or compressed, and the step of detecting a scaling factor is performed on the scaled or compressed data without decompression of the digital data.

24. A computer readable storage medium tangibly embodying a program to cause a computer to perform an electronic watermark on digital data, the program comprising:
  a function of preparing a digital embedded pattern having information that is to be embedded as an electronic watermark in digital data; and
  a function of embedding said embedded pattern in said digital data at least twice or more repeatedly;
  wherein said embedded pattern has a tuple of base block patterns that are orthogonal to each other and has a repetitive pattern in the horizontal or vertical direction.

25. A computer readable storage medium tangibly embodying a program to cause a computer to detect an electronic watermark embedded in digital data, the program comprising:
  when detecting an embedded pattern that has a tuple of base block patterns that are orthogonal to each other and has been embedded in digital data at least twice or more repeatedly, a function of finding a period having a maximum correlation by autocorrelation of said embedded repetitive pattern;
  a function of detecting a scaling factor added to a frame from a change of said period; and
  a function of detecting said embedded pattern using said scaling factor.

26. The method of claim 25, wherein the digital data is scaled or compressed, and the step of detecting a scaling factor is performed on the scaled or compressed data without decompression of the digital data.

* * * * *